(12) United States Patent
Hughes et al.

(10) Patent No.: US 10,436,335 B2
(45) Date of Patent: Oct. 8, 2019

(54) VALVES WITH MULTI-DIRECTIONAL BALL CHECK

(71) Applicants: Richard C. Hughes, Santa Fe, TX (US); Melvin O. Castillo, Texas City, TX (US); James C. Hertenberger, Santa Fe, TX (US)

(72) Inventors: Richard C. Hughes, Santa Fe, TX (US); Melvin O. Castillo, Texas City, TX (US); James C. Hertenberger, Santa Fe, TX (US)

( * ) Notice: Subject to any disclaimer, the term of this patent is extended or adjusted under 35 U.S.C. 154(b) by 0 days.

(21) Appl. No.: 15/330,546

(22) Filed: Oct. 6, 2016

(65) Prior Publication Data

US 2017/0138491 A1 May 18, 2017

Related U.S. Application Data

(60) Division of application No. 13/998,560, filed on Nov. 8, 2013, now abandoned, which is a continuation-in-part of application No. 12/762,313, filed on Apr. 17, 2010, now Pat. No. 8,584,705.

(51) Int. Cl.
| | |
|---|---|
| *F16K 15/18* | (2006.01) |
| *F16K 5/10* | (2006.01) |
| *F16K 5/02* | (2006.01) |
| *F16K 5/06* | (2006.01) |

(52) U.S. Cl.
CPC .......... *F16K 15/188* (2013.01); *F16K 5/0207* (2013.01); *F16K 5/0605* (2013.01); *F16K 5/10* (2013.01); *F16K 15/183* (2013.01); *Y10T 137/0379* (2015.04); *Y10T 137/5153* (2015.04); *Y10T 137/8803* (2015.04)

(58) Field of Classification Search
CPC ......... Y10T 137/7771; Y10T 137/7772; Y10T 137/7779; Y10T 137/778; Y10T 137/88054; Y10T 137/88022; Y10T 137/8803; Y10T 137/88038; Y10T 137/0379; Y10T 137/5153; Y10T 137/785; F16K 15/188; F16K 15/183; F16K 5/0207; F16K 5/10; F16K 5/06; F16K 15/18; F16K 5/0605; F16K 5/00
USPC ............ 137/493, 493.1, 493.8, 493.9, 614.2, 137/614.16–614.18; 251/288; 73/333, 73/332

See application file for complete search history.

(56) References Cited

U.S. PATENT DOCUMENTS

| | | |
|---|---|---|
| 181,127 A | 8/1876 | Ashcroft |
| 372,848 A | 11/1887 | Graham |
| 375,409 A * | 12/1887 | Barclay .................. F22B 37/78 137/614.14 |
| 453,814 A | 6/1891 | Loughry |
| 506,564 A | 10/1893 | Stulp |
| 546,589 A | 9/1895 | Doerhoefer |
| 652,474 A | 6/1900 | Cook |
| 749,809 A | 1/1904 | Truman |
| 764,900 A | 7/1904 | Schalt |
| 1,339,383 A | 5/1920 | Beese |
| 1,388,602 A | 8/1921 | Rottleur |
| 1,675,979 A | 7/1928 | Laird |
| 1,677,562 A | 7/1928 | Roberston |

(Continued)

*Primary Examiner* — Craig J Price
(74) *Attorney, Agent, or Firm* — Guy McClung

(57) ABSTRACT

A valve with a valve body in which is rotatably mounted a valve member, the valve member having therein a ball check for selectively preventing fluid flow through the valve.

9 Claims, 14 Drawing Sheets

(56) References Cited

U.S. PATENT DOCUMENTS

| | | | |
|---|---|---|---|
| 1,714,434 A | | 5/1929 | OBannon |
| 2,137,402 A | | 11/1938 | Hoferer |
| 2,481,183 A | | 9/1949 | Welby |
| 2,598,598 A | * | 5/1952 | Pierce .................... F02M 25/00 137/483 |
| 2,607,227 A | | 8/1952 | Biscoe |
| 3,002,368 A | | 10/1961 | Moberg |
| 3,186,196 A | | 6/1965 | Moberg |
| 3,700,003 A | | 10/1972 | Smith |
| 3,886,796 A | | 6/1975 | Gruett |
| 3,937,441 A | * | 2/1976 | Baumann ................... F16K 1/24 251/298 |
| 4,070,237 A | | 1/1978 | Woodward |
| 4,105,044 A | | 8/1978 | Davitt |
| 4,345,468 A | | 8/1982 | Jackson |
| 4,655,078 A | | 4/1987 | Johnson |
| 4,693,117 A | | 9/1987 | Mills |
| 4,838,095 A | * | 6/1989 | Sheridan ................. B01J 3/004 137/551 |
| 4,848,724 A | | 7/1989 | Pettinaroli |
| 5,004,005 A | | 4/1991 | Graves |
| 5,052,224 A | | 10/1991 | Ford et al. |
| 5,323,653 A | | 6/1994 | Gruett |
| 5,323,654 A | | 6/1994 | Newman |
| 5,383,360 A | | 1/1995 | Bertani |
| 5,442,159 A | | 8/1995 | Shank |
| 5,628,231 A | | 5/1997 | Sheridan |
| 5,648,607 A | | 7/1997 | Wolf |
| 6,234,018 B1 | | 5/2001 | Kelada |
| 7,178,544 B2 | | 2/2007 | Robison |
| 8,584,705 B2 | | 11/2013 | Hughes et al. |
| 8,839,817 B2 | | 9/2014 | Dederich et al. |

\* cited by examiner

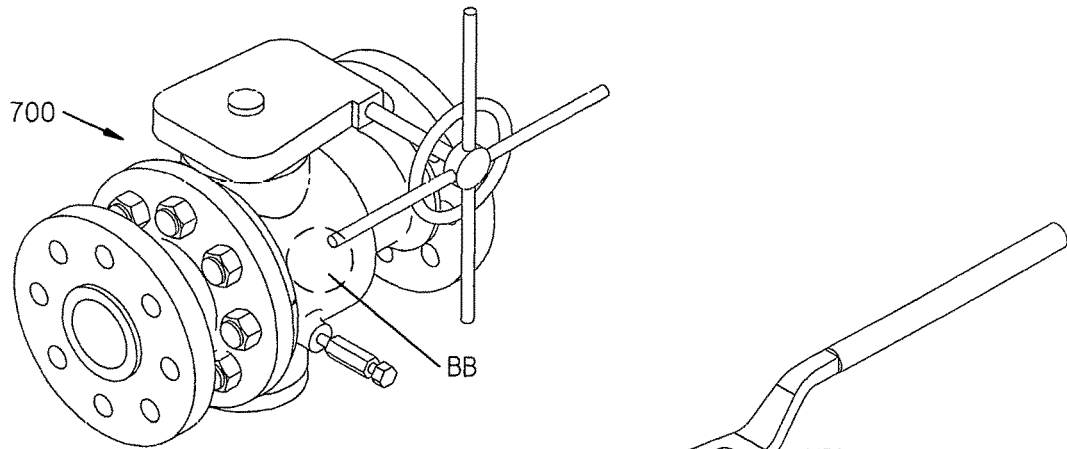
Fig. 23
2-PIECE GEAR OPERATED
Prior Art
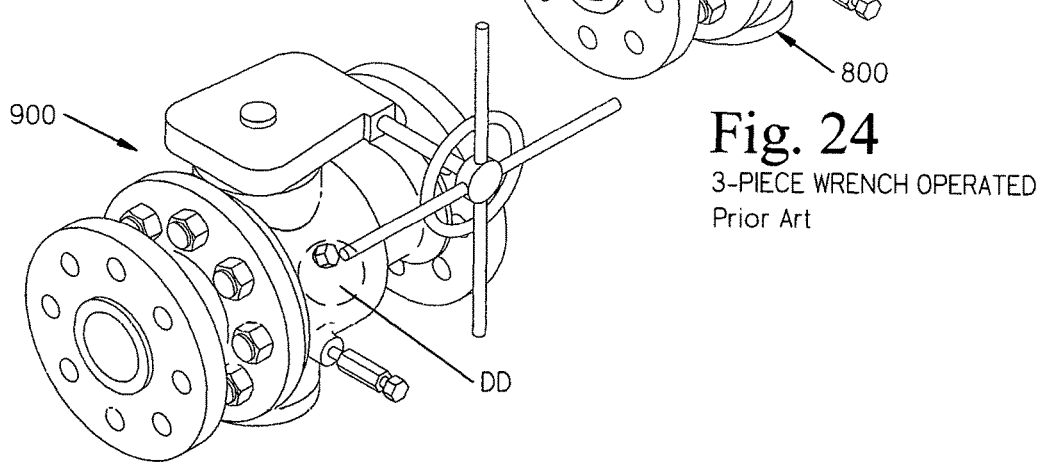
Fig. 24
3-PIECE WRENCH OPERATED
Prior Art
Fig. 25
3-PIECE GEAR OPERATED
Prior Art

VALVES WITH MULTI-DIRECTIONAL BALL CHECK

RELATED APPLICATION

This is a division of U.S. patent application Ser. No. 13/998,560 filed Nov. 8, 2013, which is a continuation-in-part relative to U.S. patent application Ser. No. 12/762,313 filed Apr. 17, 2010, from both of which applications this invention and this present application claim priority under the Patent Laws, and which applications are incorporated fully herein for all purposes.

FIELD OF THE INVENTION

The present invention is directed to: valves and methods of their use; to valves for controlling fluid flow and for permitting fluid flow in multiple directions; to ball valves and plug valves; and to valves with a built-in check valve.

BACKGROUND OF THE INVENTION

There are a wide variety of known valves, ball valves, plug valves, check valves, valves with check valves, and methods of their use.

SUMMARY OF THE INVENTION

The present invention, in certain aspects and embodiments, discloses a valve with a rotatable valve structure that includes within it a movable ball check for selectively blocking fluid flow through the valve. The valve structure may be any suitable known rotatable valve structure, such as, but not limited to, known rotatable plug members and ball members of known valves. In certain aspects, the ball check is movable within a structure, e.g., within a plug or a ball, to seat against a check seat formed of the plug or ball to stop fluid flow through the valve.

In certain aspects, such a valve has multiple operating positions and/or provides controlled flow in dual directions. In one aspect, the valve has open and closed positions. In another aspect, the valve has open, closed, and bypass positions, with dual flow directions through the valve. In certain aspects, the ball check can check fluid flowing in one of two directions through the valve by rotating the valve structure as desired.

When made of appropriate known materials, sized appropriately, and configured in a suitable manner, valves according to the present invention may be used for controlling the flow of a broad variety of fluids and in a wide variety of technical and industrial situations, including both fluids at low pressures and fluids at high pressures, e.g., including, but not limited to transmission and processing of fluids (gas, vapor, and/or liquid) in: chemical applications; petrochemical applications; refinery streams, equipment, and apparatuses; oil and gas well drilling, cementing, completion, servicing, and production operations.

In certain particular aspects, the present invention provides plug valves or ball valves with a rotatable plug or ball in a cavity in a valve body with a ball check disposed within and movable by fluid flow within the valve. The valve bodies of these valves can be shaft-rotated or stem-rotated with the shaft or stem connected to the plug or ball, or formed integrally thereof, to assist in holding the plug or ball in position within a cavity in a valve body; or one or two trunnion members may be used in conjunction with the plug or ball to support and position the plug or ball, and to facilitate its rotation within a valve body.

In certain aspects and embodiments of the present invention, a ball check is maintained within a cavity in a valve body by a member with one or more projections projecting into the cavity which prevent the ball check from exiting from the cavity. These projection(s) may be on a removable/insertable member put in place in or adjacent a flow opening of the valve body following insertion of the ball check into the cavity; or they may project from the valve body itself.

In other aspects, a ball check is inserted into a valve body cavity through a hole or opening sufficiently large for the ball check to pass through, and then the hole or opening is closed off. In certain aspects, the hole or opening is also used for insertion into the valve body of a rotating stem or member, or for the disposition of a trunnion member, any of which will close off the opening once the ball check has been disposed in the valve body cavity. In any such valve, a second flow opening or flow port of the valve body spaced-apart from or opposite the position of a ball check seat a first flow opening or port may have projection(s) that prevent the ball check's exit from the valve body through the second port or opening so that the ball check cannot seat at the second flow port or opening. Such a second flow port or opening, with projection(s), may be sized so that the presence of the ball check does not adversely affect flow through the valve when the ball check is not seated against the ball check seat and when flow through the valve is desired. In any such valve according to the present invention, the ball check may be sized and the flow ports and openings may be sized so that desired flow through the valve is effected despite the presence of the ball check within the valve body.

An apparatus for controlling the flow of fluid may include a main passageway for conducting the fluid and a valve which may include a rotatable valve cavity having a ball check. The rotatable valve cavity may be rotatable with respect to the main passageway to provide at least three positions including a bypass position, a closed position and a run position.

Such a valve may include an outlet for connection to a sight glass, and the apparatus may include a bleeder valve. Such an apparatus may include a sight glass which may be in fluid communication with the valve.

Thus, a valve according to certain embodiments of the present invention, and e.g. as shown in the drawing figures may include: a body with a first body side and a second body side; a main passageway through the body for conducting a fluid into and/or through the valve, the main passageway including a first passage opening at the first body side and a second passage opening at the second body side; a valve plug (or ball) extending through the valve body and having a cavity, e.g., a plug cavity or a ball cavity, positioned within the main passageway so that fluid flowing through the main passageway may flow through the cavity; the cavity having a first side and a second side, a first opening on the first side through which fluid may flow to and from the main passageway with respect to the cavity, a second opening on the second side through which fluid may flow to and from the main passageway with respect to the cavity, the first side opposite the second side, the first opening larger than the second opening, and an interior valve seat; the valve plug (or ball) selectively rotatable in the body (a) to permit bidirectional fluid flow through the cavity and therefore through the valve in a "run" position, (b) to close the valve to fluid flow in a "closed" position, and (c) to permit bypass fluid flow through the valve in a "bypass" position; and the valve plug or ball having a ball check movably located within the cavity, the ball check movable by action of fluid flowing through the main passageway into the cavity to seat against the valve seat to prevent fluid flow through the valve.

Such a valve may have one or some, in any possible combination, of the following: the cavity located in line with the main passageway so that fluid flowing through the main passageway does not change direction when flowing through the cavity from the first side of the cavity to the second side of the cavity and so that fluid flowing through the main passageway does not change direction when flowing through the cavity from the second side of the cavity to the first side of the cavity; the ball check passable through the first opening, the cavity having a cavity top and a cavity bottom, a projection either extending across the cavity from one side to the other or from top to bottom or the projection extending from the cavity bottom of the cavity into the cavity and having a projection top located below and spaced-apart from and not in contact with the cavity top, the projection located for maintaining the ball check in the cavity and preventing the ball check from passing through the first opening and into the main passageway and from exiting the valve body; the ball check having a ball diameter and the projection having a projection height, the ball diameter greater than the projection height, and/or the projection having a projection diameter, the ball diameter greater than the projection diameter; the cavity having a bottom surface and an inclined surface, the inclined surface between the bottom surface and the interior valve seat, the valve further including a recess defined by a surface of the projection, the bottom surface of the cavity and the inclined surface, the recess for holding the ball check when fluid is flowing through the valve; the cavity of sufficient diameter to permit fluid flow around the ball check and with the valve plug or ball in a bypass position, (a) fluid flow is able to push the ball check away from the interior valve seat and carry away a contaminate lodged between the ball check and the interior valve seat, and (b) the projection prevents the ball check from exiting the cavity; the body having a body top, the valve plug or ball having a shaft integral therewith or connected thereto projecting beyond the body top, and a handle connected to the valve shaft for rotating the valve plug or ball to select a valve position; and/or the valve such that rotating the handle one hundred eighty degrees rotates the valve plug or ball between a bypass position and a run position.

The present invention, in certain aspects, provides a valve for fluid flow control including: a body with a first body side and a second body side; a main passageway through the body for conducting a fluid into and/or through the valve, the main passageway including a first passage opening at the first body side and a second passage opening at the second body side; a valve structure, e.g., a plug or a ball, extending through the valve body and having a cavity positioned within the main passageway so that fluid flowing through the main passageway may flow through the cavity; the cavity having a first side and a second side, a first opening on the first side through which fluid may flow to and from the main passageway with respect to the cavity, a second opening on the second side through which fluid may flow to and from the main passageway with respect to the plug cavity, the first side opposite the second side, and an interior valve seat; the valve structure (e.g., plug or ball) selectively rotatable in the body (a) to permit bidirectional fluid flow through the cavity and therefore through the valve in a "run" position, (b) to close the valve to fluid flow in a "closed" position, and (c) to permit bypass fluid flow through the valve in a "bypass" position; the valve structure (e.g., plug or ball) having a ball check movably located within the cavity, the ball check movable by action of fluid flowing through the main passageway into the cavity to seat against the valve seat to prevent fluid flow through the valve; the cavity located in line with the main passageway so that fluid flowing through the main passageway does not change direction when flowing through the cavity from the first side of the cavity to the second side of the cavity and so that fluid flowing through the main passageway does not change direction when flowing through the cavity from the second side of the cavity to the first side of the cavity; the ball check passable through the first opening; the cavity having a cavity top and a cavity bottom, and a projection extending from a part of the cavity or an upward projection extending from the cavity bottom of the cavity into the cavity, the projection, in one aspect, being an upward projection having a projection top, the projection top located below spaced-apart from and not in contact with the cavity top, the projection located for maintaining the ball check in the cavity and preventing the ball check from passing through the first opening and into the main passageway and from exiting the valve body.

The present invention provides, in certain aspects, fluid systems with a vessel, a first valve, a second valve, and a sight glass; each of the first valve and the second valve being a valve according to the present invention. Such a system can include a bleeder valve in fluid communication with the sight glass and one of the valves.

Accordingly, the present invention includes features and advantages which are believed to advance valve technology. Characteristics and advantages of the present invention described above and additional features and benefits will be readily apparent to those skilled in the art upon consideration of the following detailed description of preferred embodiments and referring to the accompanying drawings. What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures.

It is, therefore, an object of at least certain preferred embodiments of the present invention to provide:

New, useful unique, efficient, nonobvious valves with a ball check within a cavity in a valve body, the body rotatable to multiple flow and/or closing positions within the valve; and New, useful, unique, efficient, nonobvious methods for using such valves.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated.

There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention. The present invention and its diverse embodiments recognize and address the long-felt needs and provides a solution to problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later disguise it by variations in form, changes, or additions of further improvements.

It will be understood that the various embodiments of the present invention may include one, some, or any possible combination of the disclosed, described, and/or enumerated features, aspects, and/or improvements and/or technical advantages and/or elements in claims to this invention.

BRIEF DESCRIPTION OF THE DRAWINGS

The invention may be understood by reference to the following description taken in conjunction with the accompanying drawings, in which, like reference numerals identify like elements. These drawings illustrate certain embodiments of the present invention and are not to be used to improperly limit the scope of the invention which may have other equally effective or legally equivalent embodiments. In the appended figures, similar components and/or features may have the same numerical reference label. Various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

FIG. 23 is a perspective view of a valve according to the present invention.

FIG. 24 is a perspective view of a valve according to the present invention.

FIG. 25 is a perspective view of a valve according to the present invention.

DETAILED DESCRIPTION OF CERTAIN EMBODIMENTS OF THE INVENTION

The present invention may include a valve body which may be rotated substantially 180 degrees in order to allow fluid to flow through the valve body and respectively in the reverse direction with respect to the valve body. Consequently, when a contaminant becomes lodged therein, e.g., with respect to a valve ball (cock ball), the valve body may be rotated, e.g. substantially 180 degrees, to allow fluid to flow in the reverse direction with respect to the valve body. As a consequence of this reverse flow, the contaminant may be washed away, e.g., contaminant lodged between a ball check within the body and a valve seat. The valve body may be rotated substantially 180 degrees to return the valve body to substantially the initial position. This operation allows the valve to be cleared with a simple operation which can be performed in a short amount of time and does not require the disassembly of or the replacement of the valve, saving time and cost.

Figures 1, 2, 3, 4:
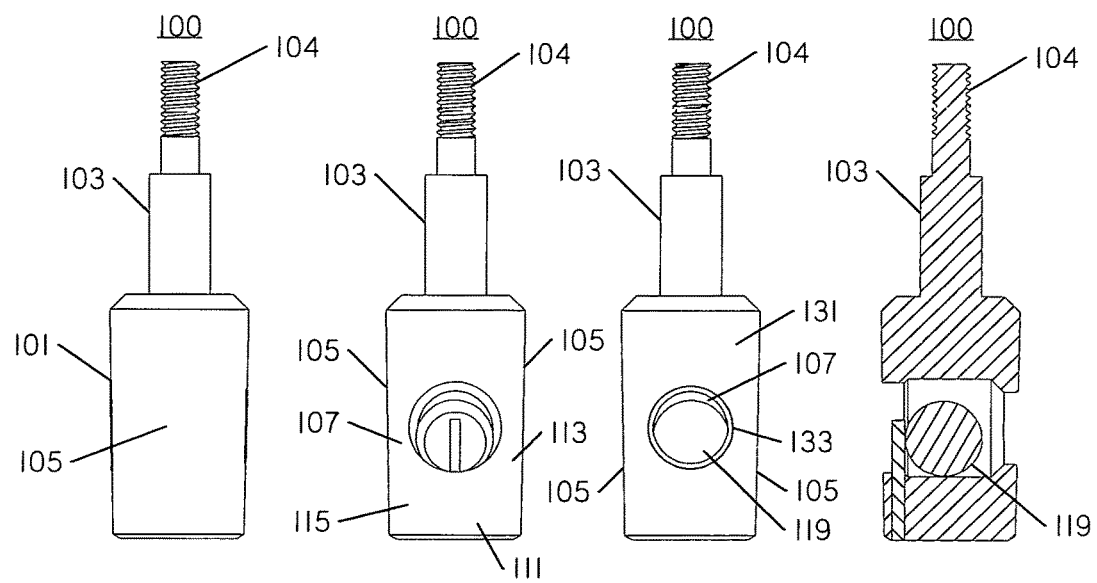
FIG. 1 illustrates a side view of a valve body of the present invention.
FIG. 2 illustrates a front view of the valve body of FIG. 1.
FIG. 3 illustrates a back view of the valve body of FIG. 1.
FIG. 4 illustrates a cross-sectional view of the valve body of FIG. 1.

FIG. 1 illustrates a valve 100 which may include a valve shaft 103 which may be rotated in order to control the position of a valve body 101 and to control the operation of the valve plug 100. The valve 100 may be referred to in various embodiments as a "valve plug," "plug valve," "ball valve," or or as a "sleeved plug valve." The valve body 101 houses a valve cavity 107 (valve passageway). FIG. 1 additionally illustrates a side surface 105 of the valve body 101 which may be opposed to a mirrored side surface 105. An end of the valve shaft 103 may include external threads 104 for attachment to a valve handle 109 (not shown).

FIG. 2 illustrates a front view of the valve plug 100 and the valve body 101 which may include a front surface 111 which may include a front aperture 113 to provide a passageway to the valve cavity 107. The valve cavity 107 may include an upward extending projection 115 which may extend into the valve cavity 107 to restrict the movement of a ball check 119 within the valve cavity 107 and the front aperture 113 may be of larger diameter or larger dimension to allow the flow of fluid around the ball check 119.

FIG. 3 illustrates a back view of the valve plug 100 and illustrates a back surface 131 of the valve body 101 which may include a back aperture 133 to form a passageway into the valve cavity 107. The back aperture 133 may have a smaller diameter or a smaller dimension than the ball check 119 in order that the ball check 119 may block or restrict the flow of fluid from the passageway out of the valve cavity 107 when there is a flow rate of the fluid which exceeds a predetermined value, e.g., which may occur when there is a break in the container of the fluid (not shown).

FIG. 4 illustrates a cross-sectional view of the valve plug 100 and illustrates the ball check 119 and the valve shaft 103.

Figure 5:
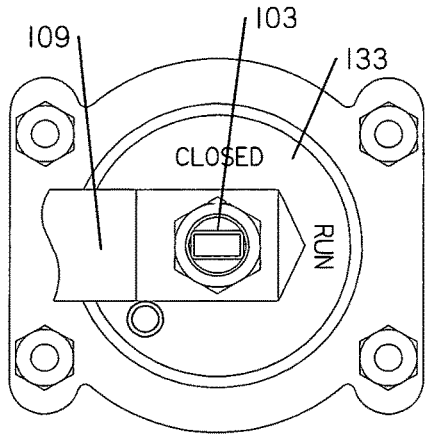
FIG. 5 illustrates a top view of the valve body of FIG. 1 in a first position.

FIG. 5 illustrates a cover 133 to cover the valve 100 over the main passageway 135 and a handle 109 to cooperate with the valve shaft 103 to rotate the valve body 101, in one aspect, to at least three positions. The cover 133 may include indicia to indicate the position, for example run, closed or bypass. The indication may be that the valve body is in a run position which may allow the fluid to flow in either direction as long as the flow rate does not exceed a predetermined value. When the flow rate exceeds the predetermined value, for example if the flow is flowing right to left, the ball check 119 may move from a rest position to cooperate with a valve seat 137 to substantially seal against the seat so that the flow of fluid is stopped once a predetermined flow rate has been exceeded. If there was a break in the main passage way 135, the flow rate of the fluid would exceed the predetermined flow rate as the fluid leaks out of the break. The seal between the ball check 119 and the valve seat 137 would prevent a large loss of fluid. Thus if the valve 100 is used in conjunction with a large vessel of fluid, the seal between the ball check 119 and valve seat 137 may prevent a large loss of fluid from the vessel.

Figure 6:
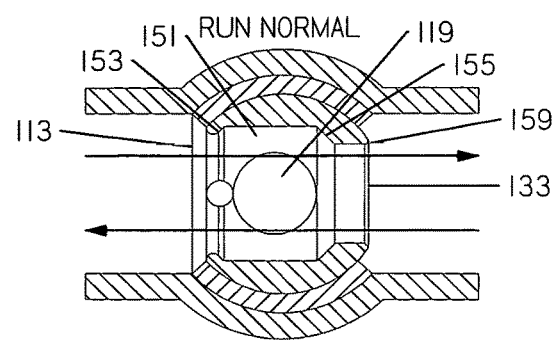
FIG. 6 illustrates a top cross-sectional of the valve body of FIG. 1 in the first position.

FIG. 6 illustrates a top view of the valve cavity 107 which may be defined by a cylinder surface 151 which may extend to a first reduced diameter cylinder surface 153 which may extend to the front aperture 113 and which may extend to an inclined surface 155 which may extend to a second reduced diameter cylinder surface 159 which may extend to the back aperture 133. The plug cavity has a bottom surface and the inclined surface 155 between the bottom surface and the valve seat 137, the valve having a recess defined by a surface of the upward projection, the bottom surface of the cavity, and the inclined surface, the recess for holding the ball check 119 when fluid is flowing through the valve.

Figure 7:
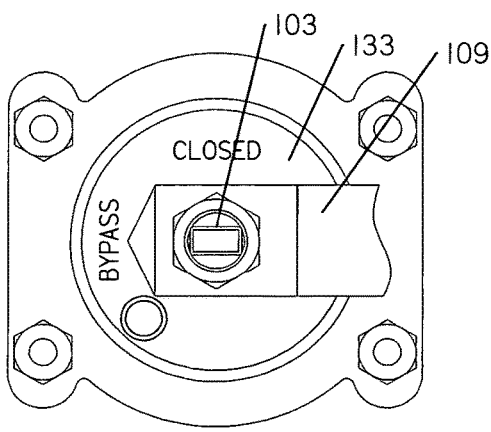
FIG. 7 illustrates a top view of the valve body of FIG. 1 in a second position.

FIG. 7 illustrates a cover 133 to cover the sleeved valve 100 over the main passageway 135 and a handle 109 to cooperate with the valve shaft 103 to rotate the valve body 101, e.g., to at least three positions. The cover 133 may include indicia to indicate the position, for example run, closed or bypass. The indication may be that the valve body is in a bypass position which may allow the fluid to flow in one direction regardless of the flow rate and does not inhibit the flow rate even if the flow rate exceeds a predetermined value. The flow of the fluid keeps the ball check 119 from seating against its valve seat 137. In the bypass position, if a contaminate becomes lodged between the ball check 119 and the valve seat 137, reverse flow of the fluid can push the ball check 119 away from the valve seat 137 and the fluid can carry the contaminant away.

Figure 8:
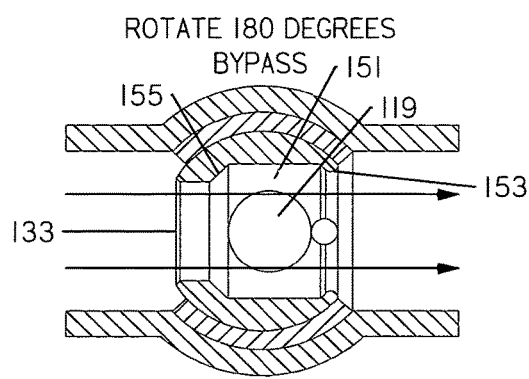
FIG. 8 illustrates a top cross-sectional view of the valve body of FIG. 1 in the second position.

FIG. 8 illustrates a top view of the valve cavity 107 in the bypass position which may be defined by a cylinder surface 151 which may extend to a first reduced diameter cylinder surface 153 which may extend to the front aperture 113 and which may extend to a inclined surface 155 which may extend to a second reduced diameter cylinder surface 159 which may extend to the back aperture 133.

Figure 9:
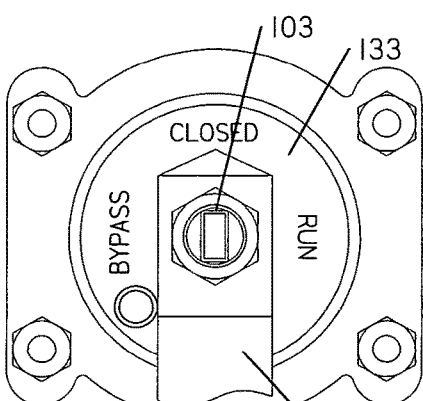
FIG. 9 illustrates a top view of the valve body of FIG. 1 in a third position.

FIG. 9 illustrates a cover 133 to cover the valve 100 over the main passageway 135 and a handle 109 to cooperate with the valve shaft 103 to rotate the valve body 101 to at least three positions. The cover 133 may include indicia to indicate the position, for example run, closed or bypass. The indication may be that the valve body is in a closed position which may not allow the flow of fluid in any direction regardless of the flow rate. Both the front aperture 113 and the back aperture 133 are blocked.

Figure 10:
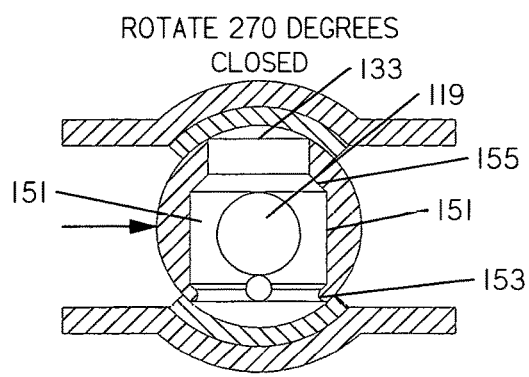
FIG. 10 illustrates a top cross-sectional view of the valve body of FIG. 1 in the third position.

FIG. 10 illustrates a top view of the valve cavity 107 which may be defined by a cylinder surface 151 which may extend to a first reduced diameter cylinder surface 153 which may extend to the front aperture 113 and which may extend to a inclined surface 155 which may extend to a second reduced diameter cylinder surface 159 which may extend to the back aperture 133.

Figure 11:
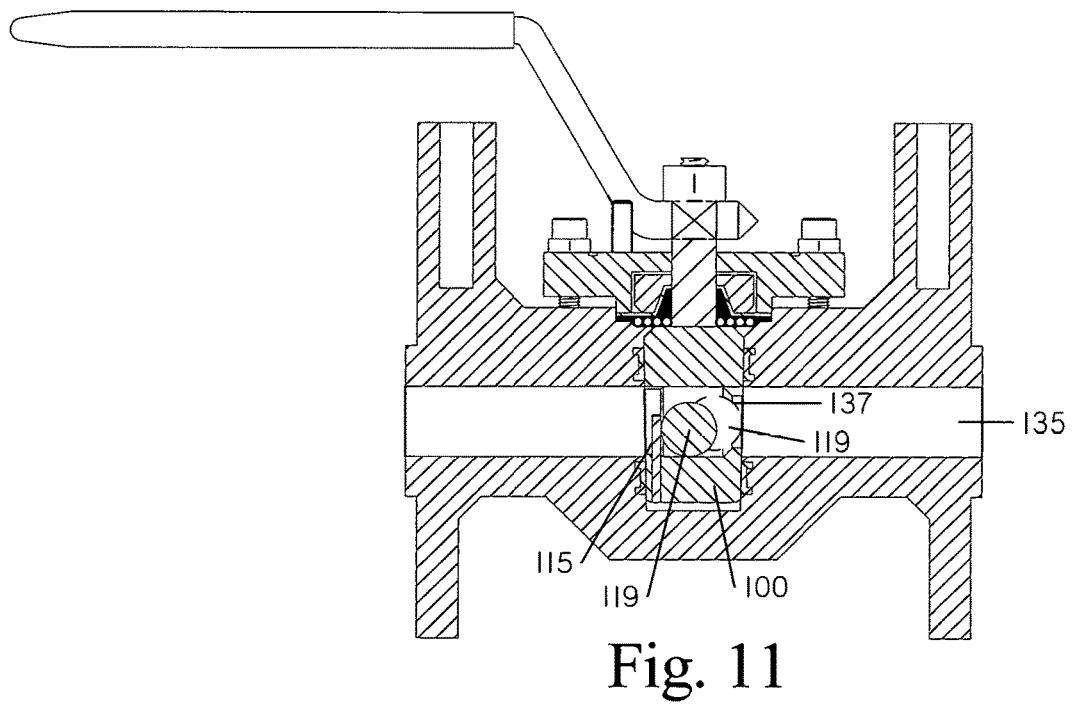
FIG. 11 illustrates a side cross sectional view of the valve body of FIG. 1 positioned within a passageway.

FIG. 11 illustrates the sleeved valve 100 positioned within the main passageway 135 and illustrates the ball check 119 at a resting position adjacent to the upward extending projection 115. This allows flow of the fluid in either direction since the ball check 119 is not positioned within the valve seat 137. However, when the flow of the fluid reaches a predetermined level, the fluid flow causes the ball check 119 to move to a second position indicated by the phantom line and adjacent to the valve seat 137 to prevent the flow of the fluid in the direction as shown left to right.

Figure 12:
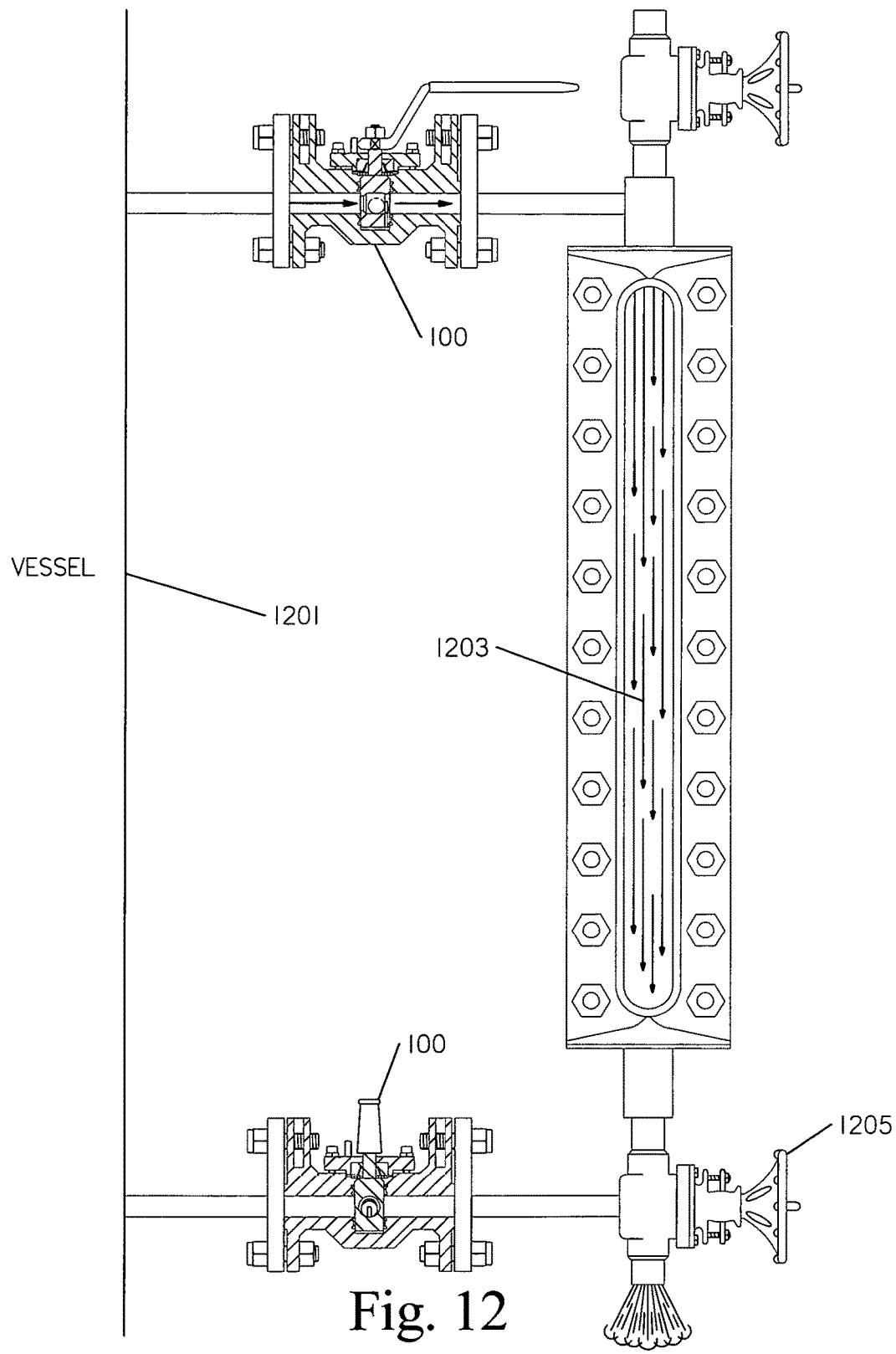
FIG. 12 illustrates a system of the present invention to determine if a tap is plugged.

FIG. 12 illustrates a system of the present invention which may include a vessel 1201 and a sight glass 1203 which may be interconnected with a first valve 100 (shown as the upper valve) and a second valve 100 (shown as the lower valve) where the first sleeved valve 100 may be in a bypass position and the second sleeved valve 100 may be in a closed position in order to verify if a tap is plugged by opening the bottom bleeder valve 1205. If a vapor is allowed to flow through the bottom bleeder valve 1205 the tap is clear.

Figure 13:
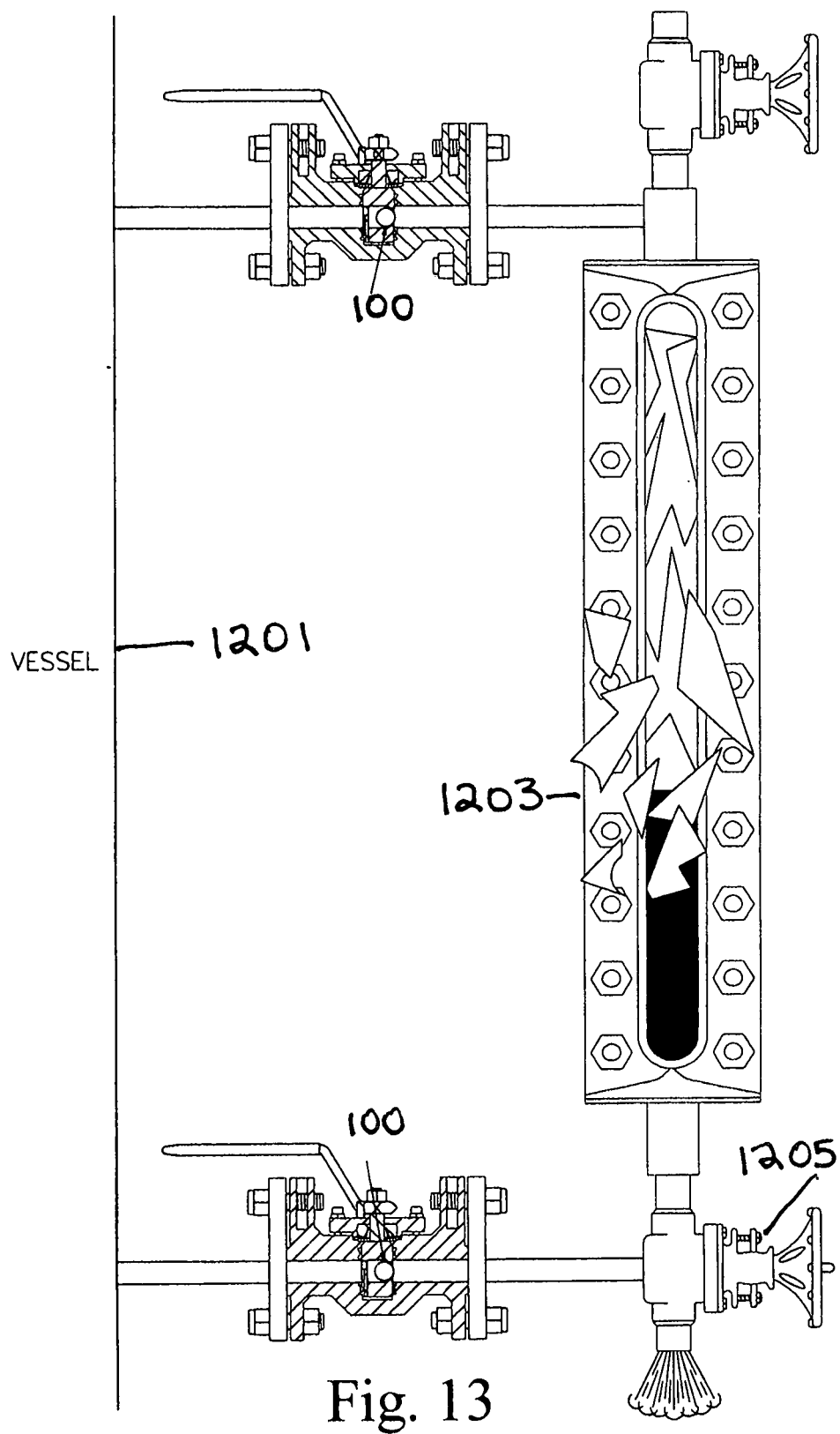
FIG. 13 illustrates a system of the present invention to prevent a high pressure liquid from escaping.

FIG. 13 illustrates a system of the present invention to prevent a high pressure liquid from escaping.

Figure 14:
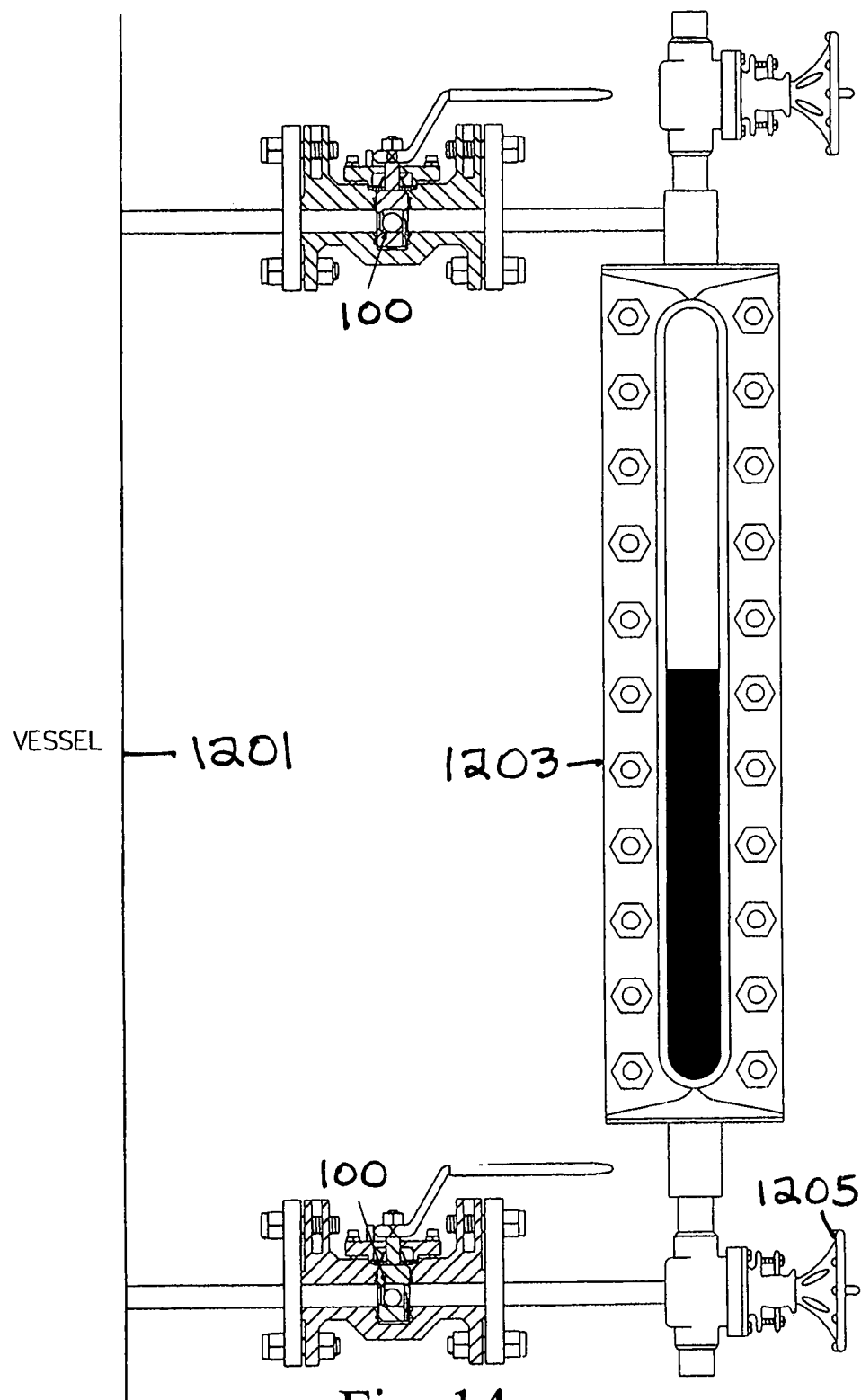
FIG. 14 illustrates a system of the present invention to verify liquid level in a vessel.

FIG. 14 illustrates a system of the present invention to verify liquid level in the vessel.

Figure 15A:
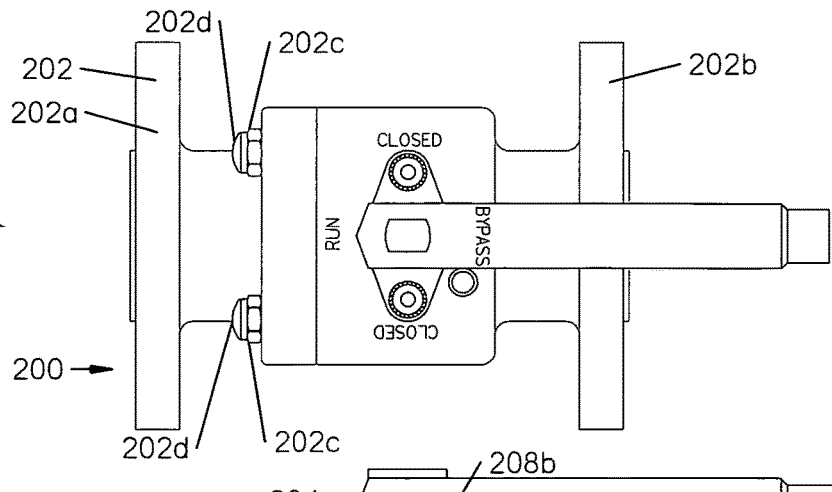
FIG. 15A is a top view of a valve according to the present invention.

FIGS. 15A and 153 show a valve 200 according to the present invention which has a housing 202 with left part 202a bolted with nuts 202c on studs 202s of right part 202b. A gasket 2029 is interposed between the two housing parts. A ball valve 220 according to the present invention is rotatable by a handle 204 to control fluid flow in a passageway 206 (with part of the passageway 206a through the left part 202a of the housing and part of the passageway 206b through the right part of the housing 202b). The stem 208 has an end 208a received in and held in a recess 230a of a valve body 230 using a thrust washer. A nut 208b above a belleville washer 208c secures the handle 204 to the stem 208. A gland follower 209a and a gland ring 209b hold stem packing 209c around the stem 208. The ball valve 220 is in a corresponding recess 213 formed of and between the two housing parts.

Figure 15B:
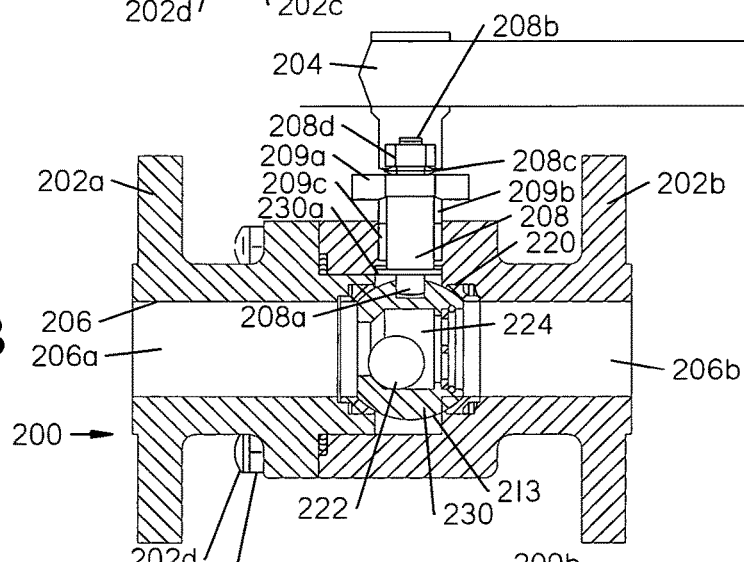
FIG. 15B is a section view of the valve of FIG. 15A.
Figure 15C:
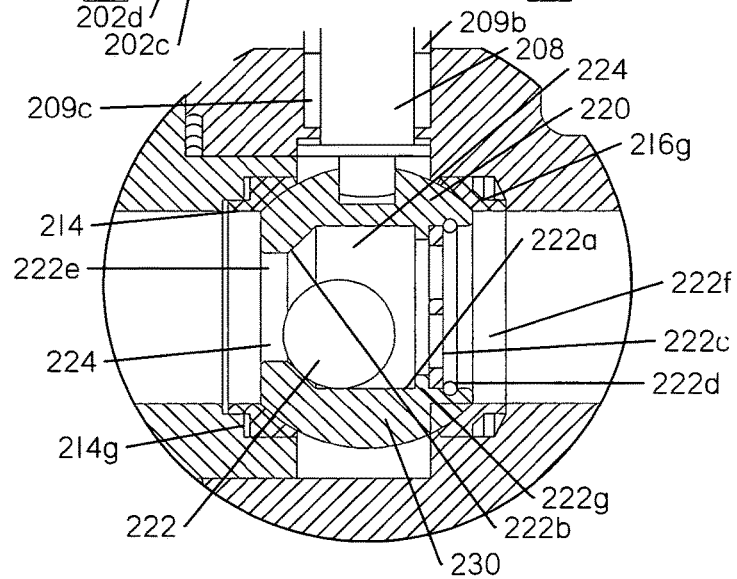
FIG. 15C is an enlargement of part of the valve as shown in FIG. 15B.

The ball valve 220 has a ball check 222 movably disposed in a passageway 224 which extends through the valve body 230. The ball check 222 can be at rest in a recess 222a of the passageway 222 as shown in FIGS. 15B and 15C; seated against a ball check seat surface 222b to close off a flow port 222e of the valve body 230; or held against a retainer plate 222c which itself is held in place by a retainer clip 222d, the retainer plate 222c preventing the ball check 222 from exiting the valve body through a flow port 222f. The retainer plate 222c abuts a guide seat 222g.

The ball valve body 230 is seated on one side against a seat 214. A seat gasket 214g is between the seat 214 and the valve body. On the other side the valve body 230 is seated against a seat 216. A seat gasket 216g is between the set 216 and the valve body 230.

Figure 15D:
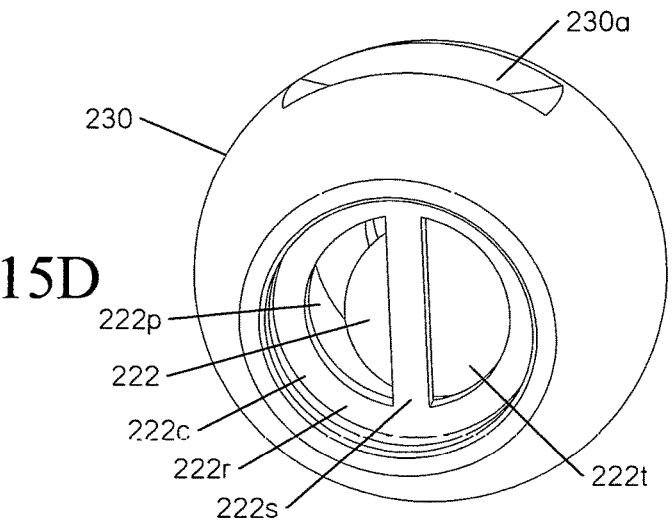
FIG. 15D is a perspective view of the valve body of the valve of FIG. 15A.

As shown in FIG. 15D, the retainer plate 222c has a ring 222r and a central member 222s that define two openings 222p and 222t through which fluid may flow through the retainer plate. In certain aspects, the retainer plate is configured and sized, and the openings 222p and 222t are configured and sized so that a desired flow rate through the retainer plate 222c is achieved (i.e., so that even with the ball check 222 abutting the retainer plate 222c, desired flow through the valve body is possible). In certain aspects, these openings are sized in area so that no more than ten percent, or no more than twenty percent of flow through the passageway opening opposite the opening with the ball check seating surface is blocked.

Figure 15E:
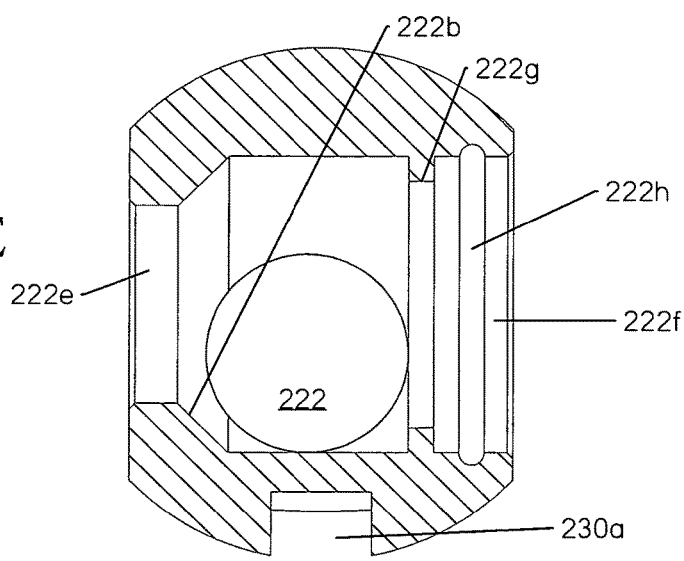
FIG. 15E is a section view of the ball of FIG. 15D.

A recess or groove 222h in the valve body (see FIG. 15E) holds the retainer clip 222d.

As shown in FIG. 15A, the handle 204 can be rotated to rotate the ball valve 220 into one of three positions—run (as shown in FIGS. 15b, 15C); closed to flow; or bypass. By reversing flow through the valve body, (either way) material or contaminants at or near the ball check seating surface 222b is moved or flushed away, insuring that a good seat can be obtained between the ball check 222 and the ball check seating surface 222b. In certain aspects the ball check is designed with a surface area presented to fluid flow (the effective area of the ball check through which fluid cannot flow in the passageway 224 through the valve body 230) and with a passageway component 224c appropriately sized, so that sufficient fluid flow is possible around the ball check in the component 224c so that a desired fluid flow rate through the valve 220 can be achieved and maintained.

As shown in FIG. 15 I, an open snap ring SG has an opening PG and, optionally, end tabs EB. Optionally, each end tab EB may have a hole HL therethrough. It is also within the scope of the present invention to use a snap ring of appropriate size and configuration (e.g., but not limited to as shown in FIG. 15 I) for the retainer. It is within the scope of the present invention to use an open "snap" ring for the retainer clip 222d to hold the retainer plate 222c in place plate itself, with or without a retainer clip or retaining snap ring.

Figure 15F:
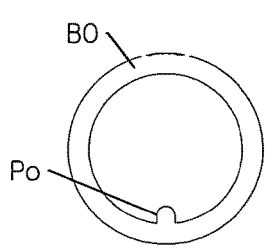
FIG. 15F is a front view of a ball check retainer for a valve according to the present invention.
Figure 15G:
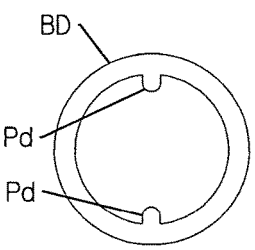
FIG. 15G is a front view of a ball check retainer for a valve according to the present invention.
Figure 15H:
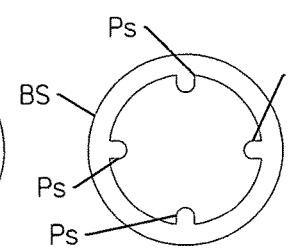
FIG. 15H is a front view of a ball check retainer for a valve according to the present invention.
Figure 15I:
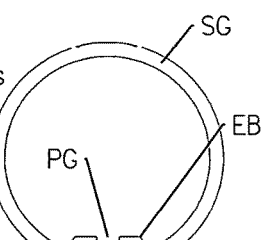
FIG. 15I is a front view of a snap ring for a valve according to the present invention.

It is within the scope of the present invention to retain a ball check within a valve body using a projection or projections projecting from the valve body which prevent the ball check from passing through a fluid flow opening near or adjacent the projection(s). One, two, three, four or more such projections may be used. FIGS. 15F-15H show valve bodies BO, BD, and BS with projection Po, projections Pd, and projections Ps, respectively.

Figure 15J:
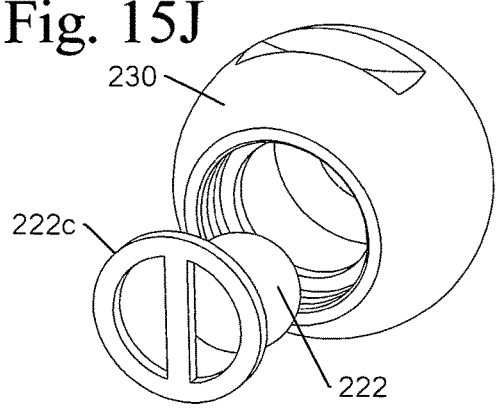
FIG. 15J is an exploded view of the valve body shown in FIG. 15D, showing the body, the ball, and the ball retainer.
Figure 15K:
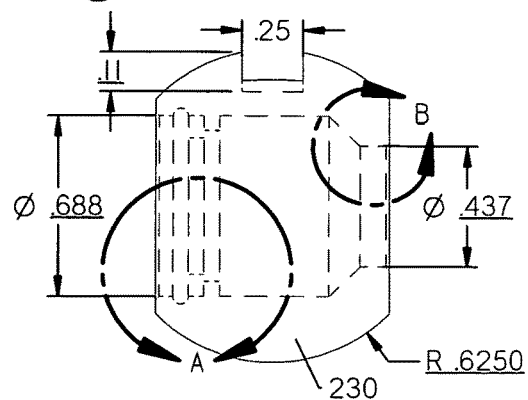
FIG. 15K is a crosssection view of valve body of FIGS. 15D and 15J.
Figure 15L:
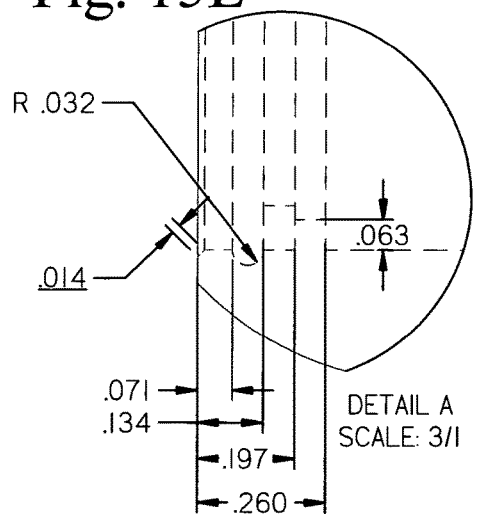
FIG. 15L is an enlargement of the Detail A indicated in FIG. 15K.
Figure 15M:
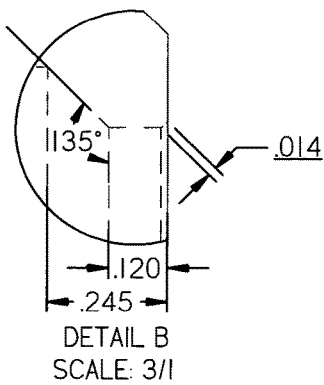
FIG. 15M is an enlargement of the Detail B as indicated in FIG. 15K.
Figure 15N:
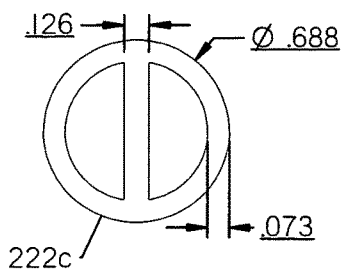
FIG. 15N is a front view of the ball retainer shown in FIG. 15J.
Figure 15O:
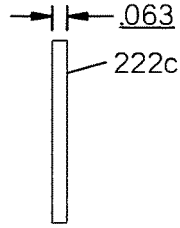
FIG. 15 O is a side view of the retainer shown in FIG. 15N.
FIG. 15P is a top view of the ball shown in FIG. 15J.
Figure 15P:
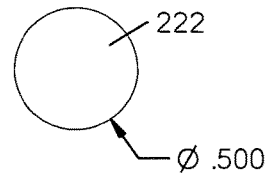

FIG. 15J shows the valve body 230, the ball check 222, and the retainer plate 222c. FIGS. 15K-15P present actual physical measurements and dimensions, in inches, for one embodiment of these parts. "R" indicates a measurement for a radius and a "ø" indicates a diameter.

It is within the scope of the present invention to provide a ball check structure for so-called "trunnion ball valves" which have an upper trunnion structure and/or a lower trunnion structure for supporting a ball of a valve, maintaining a ball's position, and/or for facilitating rotation of the ball. Any ball check and associated structure herein according to the present invention may be used in a suitable trunnion ball valve. In one particular aspect, the valve of U.S. Pat. No. 3,752,178 is improved with teaching of the present invention (patent incorporated fully herein for all purposes).

Figure 16:
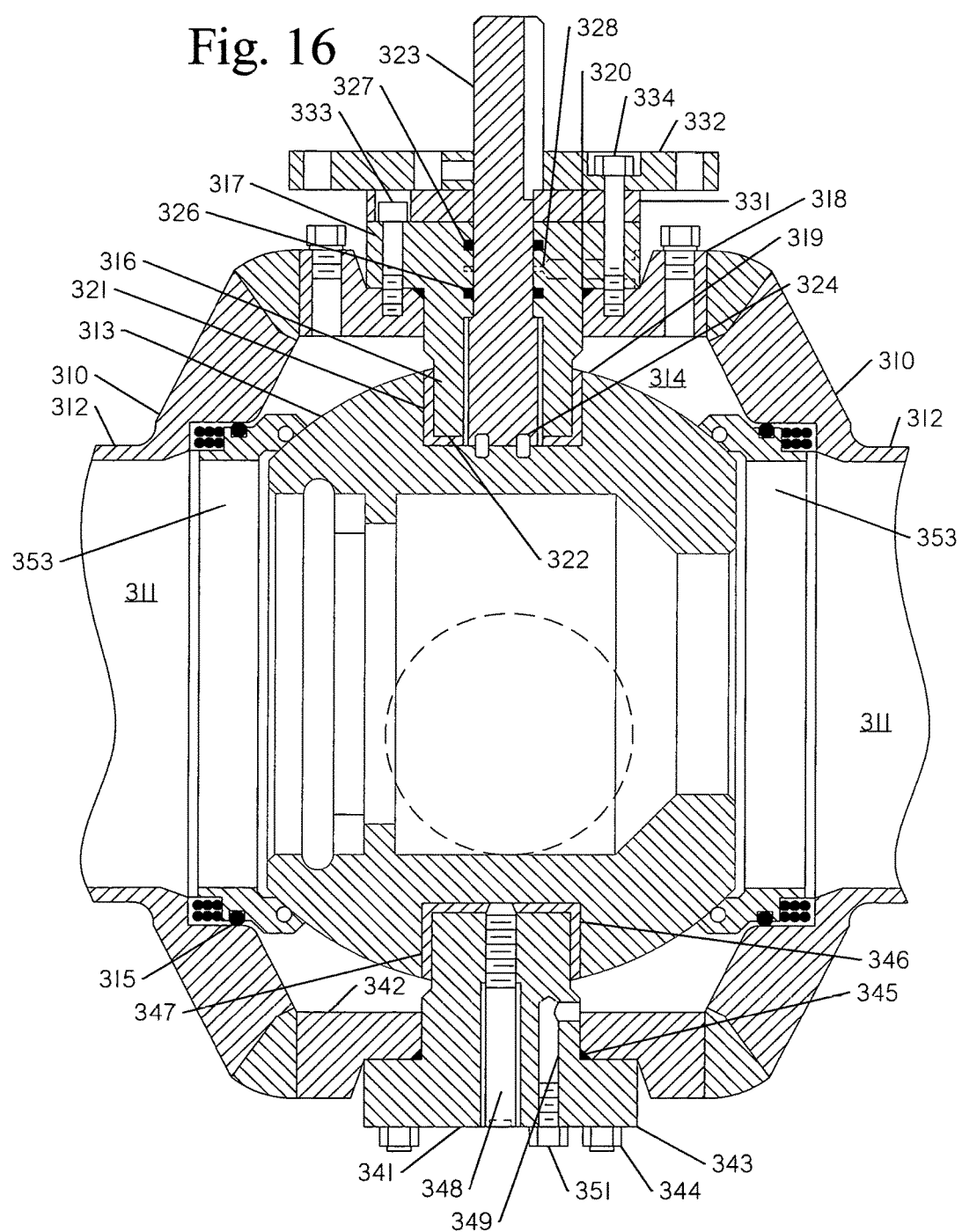
FIG. 16 is a side elevational view partly in section illustrating a valve of the ball type incorporating the present invention.
Figure 17A:
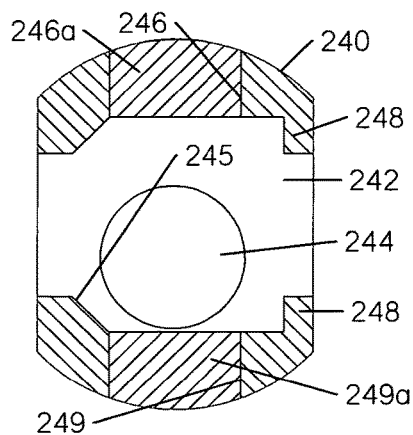
FIG. 17A is a section view of a valve body with ball check according to the present invention.
Figure 17B:
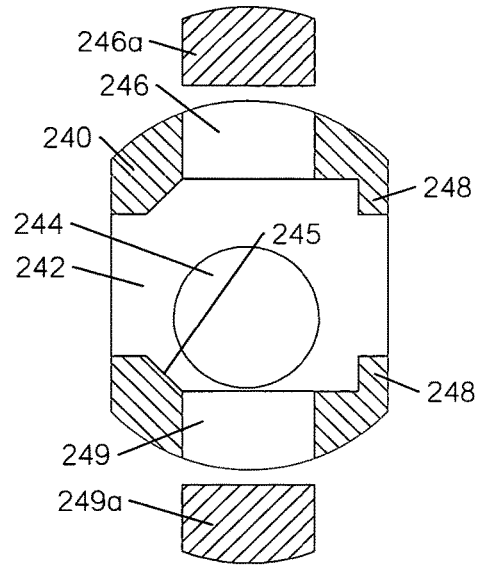
FIG. 17B is a section view of the valve body of FIG. 17A showing inserts removed.
Figure 17C:
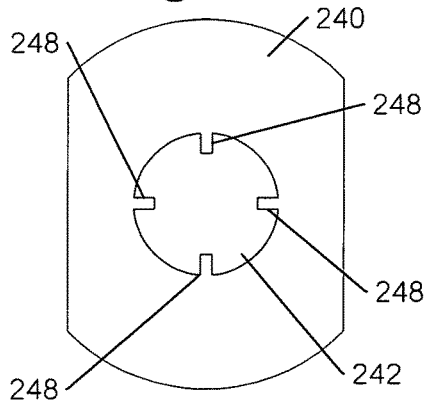
FIG. 17C is an end view of the valve body of FIG. 17A.
Figure 17D:
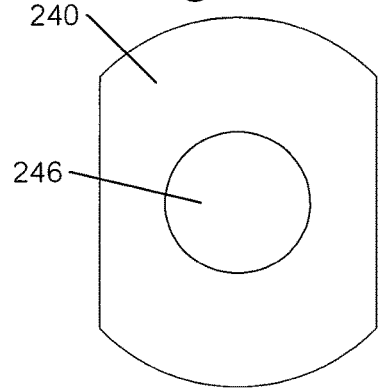
FIG. 17D is a top view of the valve body of FIG. 17A.

A ball valve 300 according to the present invention illustrated in FIG. 16 has a body 310 which may be fabricated by any suitable methods, e.g., by welding, and is provided with aligned flow passages 311. Body hubs 312 may be arranged for welding to piping, or may be provided with conventional pipe coupling flanges. A valve ball 313 is disposed within the body space 314 and is provided with a port 315 adapted to register with flow passages 311 for an open position of the valve. The body is rotatably carried by trunnion structures to enable rotation between full open and closed positions.

The trunnion structure for the upper end of the ball is a trunnion member 316 which has a flange 317 that is seated upon an upper wall portion 318 of the valve body. Its inner end portion extends within a bore 319 formed in the ball. It is sealed with respect to the body as by the resilient seals 320. Suitable bearing members 321 and 322 are interposed between the trunnion member 316 and the adjacent surfaces of the bore, and these may be made of any suitable material.

An operating shaft 323 extends through the trunnion member 316 and has its inner end coupled to the ball. Thus pins 324 are fitted into aligned openings formed in the ball and in the lower end of the shaft, thereby coupling the shaft to the ball. Axially spaced seals 326 and 327 serve to establish seals between the shaft and the trunnion member 316. Each of these seals may be of the resilient O-ring type. A duct 328 is shown communicating with the space between the seals 326 and 327 for the introduction of a viscous sealant or lubricant. This duct may be in communication with a suitable sealant injecting fitting.

A plate 331 is shown overlying the upper end of the trunnion and is between the trunnion and a mounting plate 332. Screws 333 serve to clamp the trunnion flange 317 against the body, and screws 334 may extend through the mounting plate 332, plate 331 and flange 317 and threaded into the body for clamping all of these parts together. The mounting plate facilitates the mounting of various types of operating devices upon the valve body.

The other trunnion is a trunnion member 341 which extends through the body wall portion 342 and which has an exterior flange 343 which is clamped by screws 344. Suitable seals (e.g., a resilient O-ring) 345 prevents leakage between the trunnion member 341 and the body. The inner end of the trunnion member is accommodated within a bore 346 formed in the valve ball, and bearing 347, such as a sleeve formed of suitable material, serves to provide proper journalling.

An adjustable thrust plug 348 has threaded engagement with the trunnion member 341 and is capable of adjustment from the exterior of the valve for the purpose of adjusting the position of the valve ball with respect to the flow passages 311. The trunnion member 341 is also shown provided with a duct 349 which is normally closed by plug 351, and which makes possible draining material from the valve body.

Annular sealing assemblies 353 are shown carried by the body and serve to establish seals between the body and the valve ball.

As shown in certain embodiments and as discussed above, it is within the scope of the present invention to insert a ball check into a valve body through a flow passageway opening of the passageway through the valve body and then to retain the ball check within the valve body with a retainer plate and/or projection(s). The projection(s) can be projections from the valve body or they can be projection(s) from a ring or plate placed in or near the passageway opening. Projection(s) on a valve body may be formed integrally with the valve body or they may be added after a ball check is inserted through an opening. Alternatively, a hole may be made in a valve body through which the ball check is inserted into the valve body; and then the hole is closed off by a plug, an insert, by part of a rotatable stem, or by part of a trunnion member.

FIGS. 17A-17D show a valve body 240 according to the present invention with a flow passageway 242 therethrough and a ball check 244 movably disposed in the passageway 242. The ball check 244 can be moved by flowing fluid to seat against a seating surface 245; or it can be retained within the passageway 242 by projections 248 projecting into the passageway 242 from the valve body 240.

Initially, the ball check 244 is inserted into the passageway 242 through a hole 246 and the hole is then closed off with an insert 246a. Optionally, or in addition to the hole 246, a hole 249 is provided in the valve body 240 and the ball check is inserted into the passageway 242 through the hole 249 which is then shut with an insert 249a.

Figure 18:
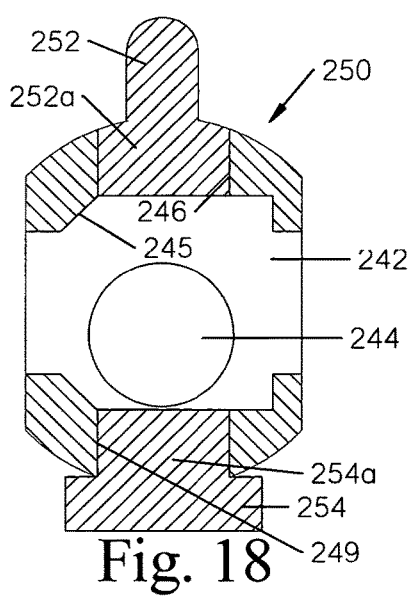
FIG. 18 is a section view of a valve body with ball check according to the present invention.

As shown in FIG. 18, the structure or member closing off a hold in a valve body through which a ball check is insertable into the valve body may be part of a rotatable stem or part of a trunnion member. FIG. 18 shows a valve body 250, like the valve body 240 (and like numerals indicate like parts) which has a stem 252 with a part 252a that closes off the hole 246 (after the ball check 244 is placed in the passageway 242 through the hole 246). A part 254a of a trunnion member 254 closes off the hole 249 (after the ball check 244 is inserted through the hole 249 into the passageway 242).

Figures 19A, 19B:
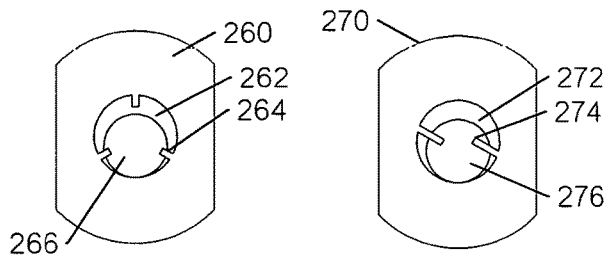
FIG. 19A is an end view of a valve body according to the present invention.
FIG. 19B is an end view of a valve body according to the present invention.

FIG. 19A shows a valve body 260 according to the present invention with a flow passageway 262 therethrough and projections 264 projecting inwardly into the flow passageway 262 to retain a ball check 266 within the valve body 260.

FIG. 19B shows a valve body 270 according to the present invention with a flow passageway 272 therethrough and projections 274 projecting inwardly into the flow passageway 262 to retain a ball check 276 within the valve body 270.

Figure 20A:
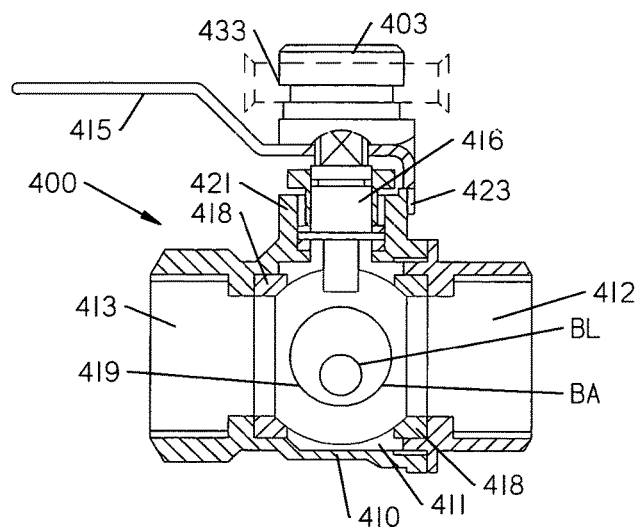
FIG. 20A is a section view of a valve with ball check according to the present invention.
Figure 20B:
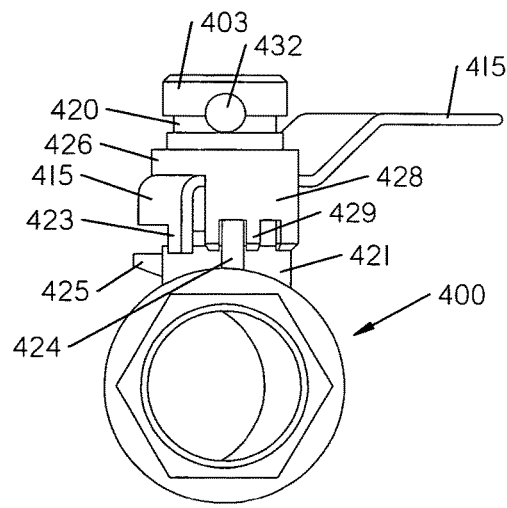
FIG. 20B is a side view of the valve of FIG. 20A.

It is within the scope of the present invention to provide a ball check valve and/or a multi-directional ball check according to the present invention in any suitable known ball valve. It is also within the scope of the present invention to provide any suitable known valve locking mechanism with any valve according to the present invention. In certain aspects, the present invention provides new and nonobvious improvements to the ball valves of U.S. Pat. No. 4,848,724, incorporated fully herein for all purposes. As shown in FIGS. 20A and 20B, a ball valve 400 according to the present invention has a ball check structure BA with a ball BL. The ball check structure and the ball BL are shown schematically and may be any suitable such structure and ball according to the present invention as disclosed herein.

Figure 20C:
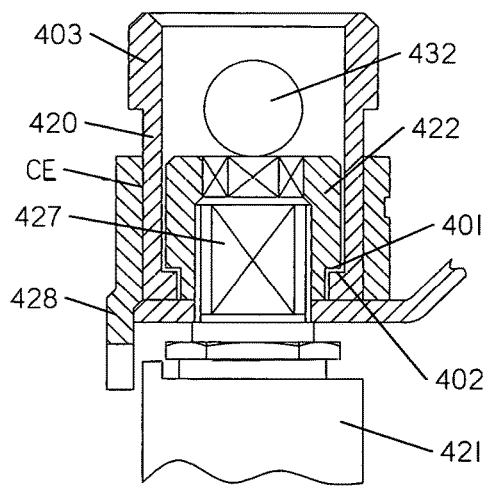
FIG. 20C is a crosssection view of the top of the valve of FIG. 20A.

The ball valve 400 has a body 410 which has two halves screwed together; the body 410 includes an intermediate portion defining an inner valve chamber 411 and end portions axially aligned defining inlet and ports 412 and 413 communicating with the valve chamber 411. The structure BA is rotatable to control through the valve and is disposed inside the chamber 411 of the body 410 of the valve; the structure BA can be rotated by means of a control lever 415 connected to a shaft 416, rotatably supported by a hub 421. The shaft 416, at its lower end is seated in a groove, while an upper end 417 is suitably shaped and received in a slot-shaped hole near the forward end of the control lever 415. The structure BA includes wall structure defining a transverse conduit 419 which, in the open condition of the valve is arranged coaxially and in communication with ports 412 and 413. The rotation of the structure BA for an angle of 90 degrees around the axis of shaft 416, brings the ball structure BA into a second closed condition of the valve in which the flow is completely cutoff. Annular sealing members 418 are disposed between the structure BA and ports 412 and 413, inside the valve chamber 411, and further sealing rings are disposed between the ball shaft 416 and the hub 421. The control lever 415 is secured to the upper end 417 of shaft 416 by a nut 422 which is screwed onto the threaded end 417 (see FIG. 20C). The nut 422 has a cylindrical lower portion and an upper enlarged portion defining an annular shoulder 401. A cylindrical element CE is located coaxially to nut 422 to freely rotate, and is prevented from axial movement by an inner annular shoulder 402 abutting against the shoulder 401 of nut 422. The upper end of the cylindrical element CE has an upper enlarged portion 403, of greater diameter, defining with the lower cylindrical portion an outer annular shoulder.

As shown in 20A, the forward end of control lever 415 is downwardly bent and provided with a downwardly protruding lip 423 so as to approach the outer cylindrical surface of the hub portion 421 of the valve body; turning the lever 415, the lip 423 engages stop protrusions 424 and 425, on the hub 421, in such a way as to define two main operative open and closed positions of the valve. This locking structure prevents or permits rotation of control lever 415, engaging and disengaging the protrusion 424 relative to said first operative position in which the ball valve is totally open. As shown, this includes a ring-shaped element 426 freely sliding and rotating in the direction and around the axis of rotation of ball structure BA. The ring-shaped element 426 has a radial wall portion along a preset angle, having downwardly turned cylindrical wall 428 concentric to the outer cylindrical surface of the hub 421. The lower edge of the cylindrical wall 428 is toothed at 429, and the sides of contiguous teeth are arranged parallel to each other and spaced apart by a distance corresponding to the thickness of protrusion 424 so that the latter can be engaged and disengaged by sliding and turning movements of the ring element 426.

The locking ring element 426 is connected to lever 415 to rotate with it in such a way as to maintain the same angular relation with respect to the lever 415 while allowing a sliding movement of ring 426. For this purpose the inner surface of cylindrical wall portion 428 of the locking ring element 421 has a longitudinal slot into which protrude a corner or protruding portion at the front edge of lever 415, which fits in such a way as to allow locking ring element 426 to rotate with lever 415 and to slide axially along cylindrical element CE at the same time, while maintaining angular position with reference to the control lever 415. The position of this slot and the angular width of the cylindrical wall portion 428 allow protrusion 424 to be between the last tooth 429 of wall 428 and lip 423 of the control lever when the valve is in the open position, and also such that when the valve is in the closed position the last tooth at the other edge of the wall 428 abuts against the protrusion 424, thus preventing rotation in either direction of lever 415 which therefore remains locked in the desired condition. The slots between teeth 429 thus define intermediate positions for partial opening of the valve, between conditions of maximum opening and fully closed.

To ensure that locking ring element 426, does not accidentally disengage from protrusion 424, or be deliberately disengaged to operate the valve, thus modifying or altering the flow conditions, a supplementary retaining means has been provided to ensure that the locking element 426 is not moved backwards or raised, and disengaged from protrusion 424 which stops rotation of the control lever. This supplemental stop or retaining device has diametrically opposed holes 432 in the upper portion of cylindrical element CE near its enlarged portion 403, through which a stop pin 433 is inserted; the ends of the pin 433 can be suitably deformed, i.e. widened, or provided with enlarged portions to prevent withdrawal. Any other equivalent means can be used instead of pin 433, e.g. a padlock, so as to ensure that locking element 426 will not move backwards or be deliberately disengaged from protrusion 424. The use of the ball valve and the operation of the locking device are as described in U.S. Pat. No. 4,848,724.

Figure 21A:
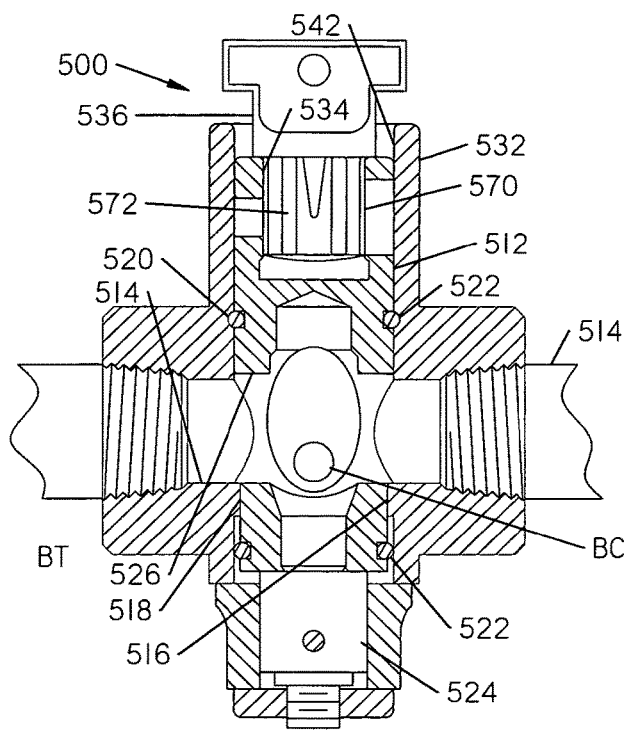
FIG. 21A is a crosssection view of a valve according to the present invention.
Figure 21E:
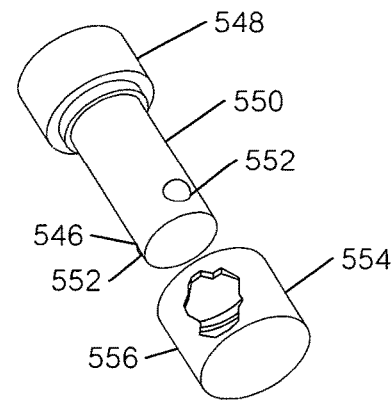
FIG. 21E is a perspective view of part of the valve of FIG. 21A.
Figure 21C:
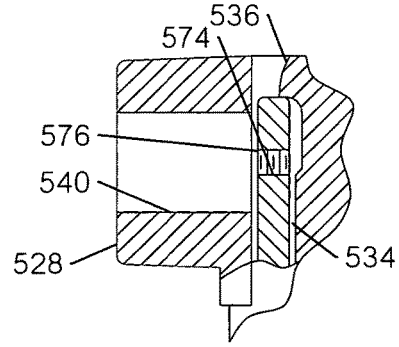
FIG. 21C is an enlargement of part of the valve of FIG. 21B.

It is within the scope of the present invention to provide a ball check valve and/or a multi-directional ball check according to the present invention in any suitable known rotary plug valve. It is also within the scope of the present invention to provide any suitable known rotary plug valve locking mechanism with any valve according to the present invention. In certain aspects, the present invention provides new and nonobvious improvements to the ball valves of U.S. Pat. No. 3,554,218, incorporated fully herein for all purposes. As shown in FIGS. 21A and 21B, a plug valve 500 according to the present invention has a ball check structure BT with a ball BC. The ball check structure BT and the ball BC are shown schematically and may be any suitable such structure and ball according to the present invention as disclosed herein.

As shown in FIGS. 21A and 21B, the valve 500 has a body 510 with an annular skirtlike extension 528 circumscribing the upper open end of the valve plug seat 516 and defining an extension of the same. A valve plug member 512 is provided with an end portion, which extends upwardly within the skirtlike extension 528, but terminates flush with or beneath the outer edge 532 of the same. The end portion 530 of valve plug member 512 is provided with an axially extending noncircular socket 534, which is, e.g., square or rectangular in cross section. The socket 534 is arranged to receive either a T-shaped operating head or handle member 536 or a closure. The valve body member 510 has a flow passage extending therethrough constituted by the ports or openings 514, the outer ends of which are threaded, as is usual for connections with other parts of the system being controlled, such as the ends P of sections of pipe line (shown in broken lines). Of course, other means of connection may be employed, such as flange connections or the like. Extending laterally through the valve body member 510 is a valve plug seat 516 open at least at one end for reception of the valve plug member 512. The seat may be tapered at least in a major or principal portion thereof. The valve plug member 512 includes a major portion which is exteriorly tapered as at 518 to be received in the tapered portion of the plug seat 516 of the body 510. Circumferential grooves 520 are provided at either end of the tapered portion 518 of valve plug member 512, the grooves 520 receiving O-ring seals 522 for providing a further seal against leakage, in addition to the seating surfaces of the tapered portions 516 and 518.

Outwardly of the lower circumferential groove 520, the valve plug member 512 is provided with a reduced valve stem 524, the valve stem 524 being utilized to secure the valve plug member 512 in the valve body 510 by any suitable means, such as, for example, those described in U.S. Pat. No. 2,653,791. The valve plug member 512 is further provided with a passageway or port 526 extending therethrough, the passageway or port 526 being complementary in shape and size to the flow passage or port openings 514 of the valve body 510. By rotation of the valve plug member 512, on its axis through an arc of substantially 90 degrees, the flow passageway 526 can be brought into and out of alignment with the passage 514 of the valve body 510 to respectively open and close the rotary plug valve.

The skirtlike extension 528 is provided with a bore 540 therethrough transverse of the axis of the valve plug seat 16, which intersects the axial bore 542, the bore 542 being in effect an extension of the plug seat. The end portion 530 of the valve plug member 512 is provided with a bore 544 therethrough, the bore 544 intersecting the axially extending socket 534. As will be noted, the bore 544 has a reduced portion 545. When the rotary plug valve is in the closed position, the bores 540 and 544 are in axial alignment and provide a means for receiving elongated plunger-type lock member 546. This valve has a conventional elongated plunger-type lock member 516, such as shown in the U.S. Pat. Nos. 3,002,368 and 3,186,196. The plunger-type lock member 516 for the purpose of this description includes a first enlarged head 548 having a reduced shank 550, the shank 550 carrying a pair of steel balls 552 held in an outward position by a plunger (not shown) reciprocal within the reduced shank 550. A second separate enlarged cup-shaped head 554 is provided, the cup-shaped head being arranged to receive the reduced shank 550 and having an annular groove 556 on the interior thereof which is arranged to receive the balls 552 when the plunger (not shown) is in a position within the shank 550 to prevent the balls from moving radially inwardly. This locks the two elements of the plunger-type lock member together until such time that a key means (not shown), such as disclosed in either of the aforementioned U.S. Pat. No. 3,002,368 or 3,186,196 is inserted axially through one of the heads to move the plunger from between the balls.

The plunger-type lock member 546 is shown inserted through the bores 540 and 544. At least a portion of the bore 544 is reduced so that the head 548 and the head 554 are arranged to engage a portion of the valve plug member to prevent the plunger-type lock member from being moved axially when in the locked position.

Figure 21D:
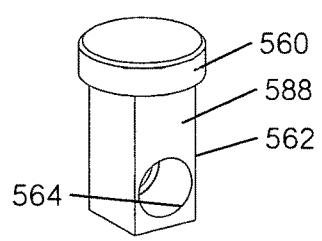
FIG. 21D is an enlargement of the valve of FIG. 21A.
Figure 21B:
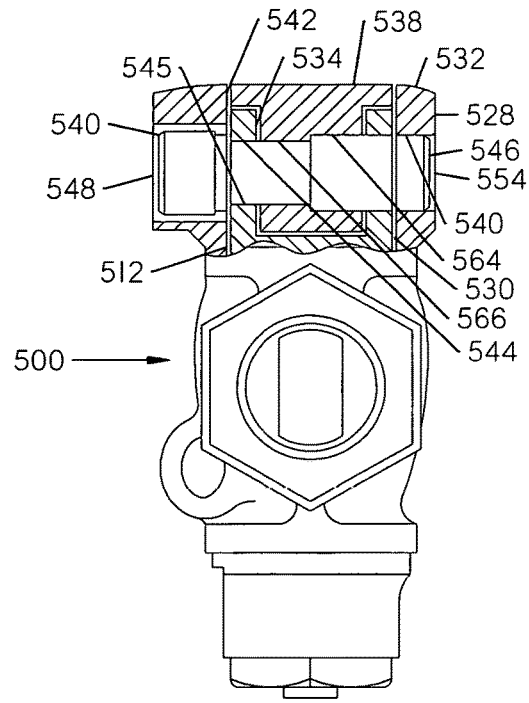
FIG. 21B is a top view, partially in crosssection, of the valve of FIG. 21A.
Figure 22A:
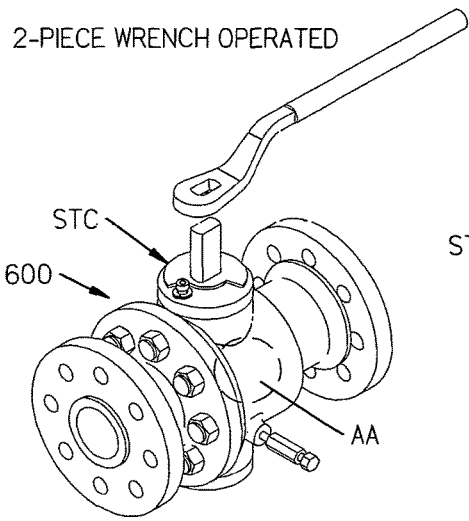
FIG. 22A is a perspective view of a valve according to the present invention.
Figure 22D:
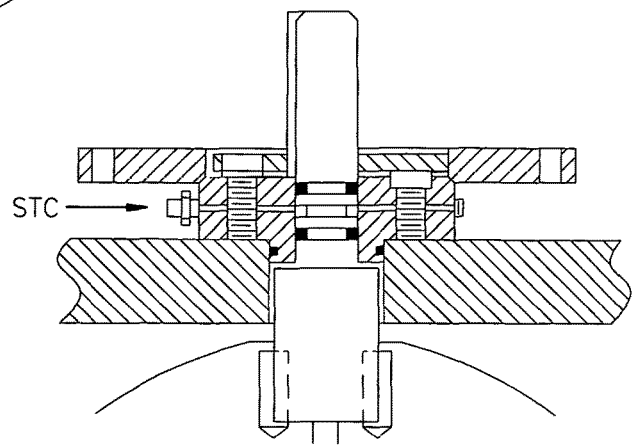
FIG. 22D is a crosssection view of parts of the valve of FIG. 22A which parts are in the prior art.
Figure 22B:
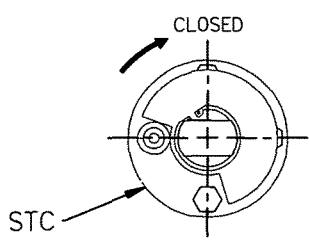
FIG. 22B is a top view of part of the valve of FIG. 22A, this part alone being prior art.
Figure 22E:
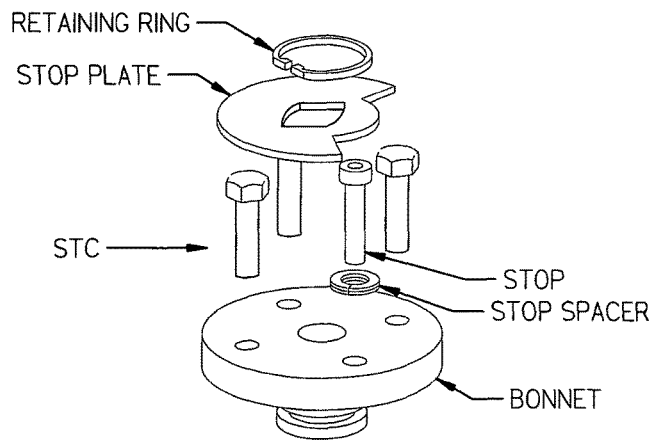
FIG. 22E is an exploded view showing parts at the top of the valve of FIG. 22A, which parts are in the prior art.
Figure 22C:
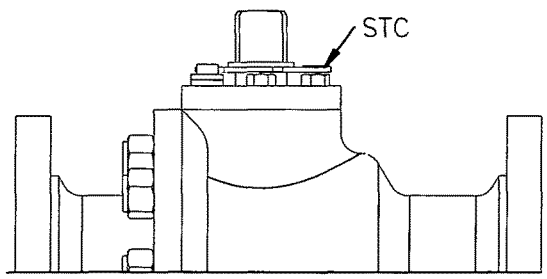
FIG. 22C is a side view of part of the valve of FIG. 22B.

As shown in FIG. 21D, the closure plug 538 is provided with a head 560 and an end portion 562, which is noncircular in cross section and which is complementary to the noncircular socket 534. In the end portion 562, the closure plug 538 is provided with a bore 564 extending therethrough, the bore 564 having a reduced portion. The bore 564 has a reduced portion and the bore 544 has the reduced portion 545 which are adjacent one another and receive the shank 550. The purpose of having at least a portion of the bores 544 and 564 of greater diameter than the shank 550 and at least sufficient to receive the cup-shaped head 554 is because the length of the head is such that it is greater than the wall thickness of the skirtlike extension 528. An operating head or handle member is provided with an end portion, which is noncircular in cross section and complementary to the socket 534 and a flat T-shaped portion for receiving a wrench to turn the valve plug member 512. The end portion is provided on its surface with at least one groove, which extends downwardly for a portion of its axial length (see U.S. Pat. No. 3,554,218). The end portion 530 of the valve plug member 512 is provided with a tapped or threaded hole 574 intermediate the ends of the bore 544, the tapped or threaded hole 574 extending through the wall and opening to the socket 534. When the rotary plug valve is closed, it is necessary to insert the operating handle 536 into the socket, then turn the valve plug member 512 to the open position, and this brings the hole 574 therein into alignment with the bore 540 in the skirtlike extension 528. Access may then be had to the set screw and it can be threaded inwardly so that its end is received in the groove 572 and thus it retains the operating head or handle member 536 against axial movement. The valve can then be turned on and off as desired. When it is desired to lock the valve, the set screw or retaining screw 576 must be removed while the valve is in the open position, the handle member 536 then being utilized to turn the valve to the closed position. The handle is then axially removed from the end of the valve plug member 512 and the closure plug 538 inserted with the elongated plunger type lock 546 being subsequently applied to the aligned bores as previously described.

The teachings of the present invention can be applied by one of skill in this art who has the creative benefits of this invention to certain valves of TK Valve & Manufacturing, Inc. Valves according to the present invention in FIGS. 22A-25 are improved ball valves with a ball check structure and ball check—shown schematically as AA, BB, CC, and DD—according to the present invention. It is also within the scope of the present invention to use stop structure with any valve according to the present invention and to use any suitable known stop structure. FIGS. 22B-22E show the known stop structure STC used with known TK ball valves which can be used with valves (e.g., as in FIGS. 22A-25) according to the present invention. With gear-driven embodiments, any suitable gear locking mechanism may be used.

As can be easily understood from the foregoing, the basic concepts of the present invention may be embodied in a variety of ways. It involves both structures, method steps, and techniques as well as devices to accomplish the appropriate ends. Techniques and method steps according to the present invention are disclosed as part of the results shown to be achieved by the various devices and structures and described and as steps which are inherent to utilization and are simply the natural result of utilizing the devices and structures as intended and described. In addition, while some devices and structures are disclosed, it should be understood that these not only accomplish certain methods but also can be varied in a number of ways. As to all of the foregoing, all of these facets should be understood as encompassed by this disclosure.

The discussion herein is intended to serve as a basic description. The specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. These are implicitly included in this disclosure.

Where the invention is described in device-oriented or apparatus-oriented terminology, each element of the device or apparatus implicitly performs a function. Apparatus claims may not only be included for the device or apparatus described, but also method or process claims may be included to address the functions the invention and each element performs. Neither the description nor the terminology is intended to limit the scope of the claims that will be included in any subsequent patent application.

It should also be understood that a variety of changes may be made without departing from the scope of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application.

It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action.

Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "support" should be understood to encompass disclosure of the act of "supporting"— whether explicitly discussed or not—and, conversely, were there effectively disclosure of the act of "supporting", such a disclosure should be understood to encompass disclosure of a "support". Such changes and alternative terms are to be understood to be explicitly included in the description.

Any acts of law, statutes, regulations, or rules mentioned in this application for patent; or patents, publications, or other references mentioned in this application for patent are hereby incorporated fully and for all purposes by reference. In addition, as to each term used it should be understood that unless its utilization in this application is inconsistent with such interpretation, common dictionary definitions should be understood as incorporated for each term and all definitions, alternative terms, and synonyms are hereby incorporated by reference.

The inventors should be understood to have support to claim and make a statement of invention to at least: i) each of the systems and new parts thereof as herein disclosed and described, ii) the related methods disclosed and described, iii) similar, equivalent, and even implicit variations of each of these systems, parts, and methods, iv) those alternative designs which accomplish each of the functions shown as are disclosed and described, v) those alternative designs and methods which accomplish each of the functions shown as are implicit to accomplish that which is disclosed and described, vi) each aspect, feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, and xii) each potentially dependent claim or concept as a dependency on each and every one of the independent claims or concepts presented.

With regard to claims whether now or later presented for examination, it should be understood that for practical reasons and so as to avoid great expansion of the examination burden, the inventors may at any time present only initial claims or perhaps only initial claims with only initial dependencies. Support should be understood to exist to the degree required under new matter laws—including but not limited to European Patent Convention Article 123(2) and United States Patent Law 35 USC 132 or other such laws— to permit the addition of any of the various dependencies or other elements presented under one independent claim or concept as dependencies or elements under any other independent claim or concept. In drafting any claims at any time whether in this application or in any subsequent application, it should be understood that the applicant has intended to capture as full and broad a scope of coverage as legally available.

To the extent that insubstantial substitutes are made, to the extent that the applicant did not in fact draft any claim so as to literally encompass any particular embodiment, and to the extent otherwise applicable, the applicant should not be understood to have in any way intended to or actually waived or relinquished such coverage.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. A reference to an element by the indefinite article "a" does not exclude the possibility that more than one of the element is present, unless the context clearly requires that there be one and only one of the elements.

Any claims set forth at any time during the pendency of the application for this patent or offspring of it are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Certain changes can be made in the subject matter without departing from the spirit and the scope of this invention. It is realized that changes are possible within the scope of this invention and it is further intended that each element or step recited herein is to be understood as referring to the step literally and/or to all equivalent elements or steps. It is intended to cover the invention as broadly as legally possible in whatever form it may be utilized.

The invention described herein is new and novel in accordance with 35 U.S.C. § 102 and satisfies the conditions for patentability in § 102. The invention described herein is not obvious in accordance with 35 U.S.C. § 103 and satisfies the conditions for patentability in § 103. The inventors may rely on the Doctrine of Equivalents to determine and assess the scope of the invention.

All patents and applications identified herein are incorporated fully herein for all purposes.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

What is claimed is:

1. A valve comprising a ball valve, the ball valve comprising
a valve body with a main passageway therethrough for fluid flow through the valve,
a valve member positioned rotatably in the valve body for controlling fluid flow in the main passageway, the valve member comprising a ball,
the ball having a ball passageway therethrough and the ball positionable in fluid communication with the main passageway of the valve,
the ball passageway having a first flow port at a first end of the ball passageway and a second flow port at a second end of the ball passageway, the first end spaced apart from the second end,
a ball check movably disposed within the ball in the ball passageway, the ball check having a maximum diameter,
the ball having a ball seat against which the ball check can seat to close off the ball passageway to fluid flow to prevent fluid flow through the first flow port,
the main passageway of the body having a flow portion between the first flow port and the ball check, the flow portion having a flow portion dimension, the flow portion dimension smaller than the maximum diameter of the ball check so that the ball check is not passable through the flow portion and is not passable out of the ball,
the ball member having retaining structure at the second flow port to retain the ball check and prevent the ball check from exiting from the ball member through the second flow port, the retaining structure secured to the ball,
the ball positionable in three positions, the three positions including a first position, a second position, and a third position, each of the three positions different from the other two positions, the ball selectively rotatable to one of the three positions,
the first position different from the second position, the first position different from the third position and comprising a run position in which the ball is positioned permitting fluid flow in a first direction through the valve from the first flow port to the second flow port and fluid flow in a second direction through the valve from the second flow port to the first flow port,
the second position different from the first position, the second position different from the third position, the second position comprising a bypass position in which the ball is positioned permitting fluid flow in the second direction through the valve from the second flow port to the first flow port, and
the third position different from the second position, the third position different from the first position, the third position comprising a closed position in which the ball is positioned to close the valve to fluid flow,
wherein the ball passageway, the ball check, and the retaining structure are sized so that desired fluid flow is permitted through the valve and around the ball check in both the first position and in the second position,
wherein the retaining structure is a plate secured within the ball, the plate having a shape that is generally a flat cylinder, the plate having open area through which fluid flowing through the ball passageway is flowable, the plate further comprising
a ring and a central member, the central member extending across the ring, and
the open area comprising two opposed flow openings, each flow opening between a portion of the ring and a portion of the central member.

2. The valve of claim 1 further comprising
a stem, a portion of the stem extending through the valve body and rotatable therein, the stem having an end,
the ball having a recess for receiving and holding the end of the stem,
the end of the stem within the recess.

3. The valve of claim 1 further comprising
the ball valve comprising a trunnion ball valve,
the trunnion ball valve having a trunnion structure enabling rotation of the ball,
the trunnion structure comprising an upper trunnion and a lower trunnion,
the ball having an upper bore, the upper trunnion having a lower end, the lower end disposed within the upper bore,
the ball having a lower bore, the lower trunnion having an upper end, the upper end disposed within the lower bore.

4. The valve of claim 1 wherein
the retaining structure is a plate secured within the ball, the plate having a shape that is generally a flat cylinder, the plate having an open area through which fluid flowing through the ball passageway is flowable.

5. The valve of claim 4 further comprising
a groove in the ball,
a clip in the groove holding the plate within the ball.

6. The valve of claim 5 wherein the clip is a snap ring that holds the plate in place.

7. The valve of claim 6 wherein the snap ring is an open ring.

8. The valve of claim 1 wherein the ball is movable from the first position to the second position to cause fluid flowing in the valve to flush contaminants from within the valve.

9. A valve comprising a ball valve, the ball valve comprising
a valve body with a main passageway therethrough for fluid flow through the valve,
a valve member positioned rotatably in the valve body for controlling fluid flow in the main passageway, the valve member comprising a ball,
the ball having a ball passageway therethrough and the ball positionable in fluid communication with the main passageway of the valve,
the ball passageway having a first flow port at a first end of the ball passageway and a second flow port at a second end of the ball passageway, the first end spaced apart from the second end,
a ball check movably disposed within the ball in the ball passageway, the ball check having a maximum diameter, the ball having a ball seat against which the ball check can seat to close off the ball passageway to fluid flow to prevent fluid flow through the first flow port,
the main passageway of the body having a flow portion between the first flow port and the ball check, the flow portion having a flow portion dimension, the flow portion dimension smaller than the maximum diameter of the ball check so that the ball check is not passable through the flow portion and is not passable out of the ball,
the ball having retaining structure at the second flow port to retain the ball check and prevent the ball check from exiting from the ball through the second flow port, the retaining structure secured to the ball, the ball positionable in three positions, the three positions including a first position, a second position, and a third position, each of the three positions different from the other two positions, the ball selectively rotatable to one of the three positions, the first position different from the second position, the first position different from the third position and comprising a run position in which the ball is positioned permitting fluid flow in a first direction through the valve from the first flow port to the second flow port and fluid flow in a second direction through the valve from the second flow port to the first flow port, the second position different from the first position, the second position different from the third position, the second position comprising a bypass position in which the ball is positioned permitting fluid flow in the second direction through the valve from the second flow port to the first flow port, and the third position different from the second position, the third position different from the first position, the third position comprising a closed position in which the ball is positioned to close the valve to fluid flow, wherein the ball passageway, the ball check, and the retaining structure are sized so that desired fluid flow is permitted through the valve and around the ball check in both the first position and in the second position, wherein the ball is movable from the first position to the second position to cause fluid flowing in the valve to flush contaminants from within the valve, the retaining structure comprising a plate and a guide seat, the guide seat projecting inwardly from the ball passageway, the guide seat having an inner surface, part of the inner surface defining an end of a recess, and part of the plate abutting part of the guide seat.

* * * * *